(12) United States Patent
Nagase et al.

(10) Patent No.: US 11,705,785 B2
(45) Date of Patent: Jul. 18, 2023

(54) STATOR

(71) Applicant: SUBARU CORPORATION, Tokyo (JP)

(72) Inventors: Kimihiro Nagase, Tokyo (JP); Kenichi Fukunaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 157 days.

(21) Appl. No.: 17/390,333

(22) Filed: Jul. 30, 2021

(65) Prior Publication Data

US 2022/0052586 A1 Feb. 17, 2022

(30) Foreign Application Priority Data

Aug. 12, 2020 (JP) .................. 2020-136171

(51) Int. Cl.
*H02K 11/25* (2016.01)
*H02K 3/12* (2006.01)
*H02K 1/16* (2006.01)
*H02K 3/52* (2006.01)
*H02K 3/28* (2006.01)

(52) U.S. Cl.
CPC ............ *H02K 11/25* (2016.01); *H02K 1/165* (2013.01); *H02K 3/12* (2013.01); *H02K 3/28* (2013.01); *H02K 3/522* (2013.01)

(58) Field of Classification Search
CPC ............ H02K 1/165; H02K 3/12; H02K 3/14; H02K 11/25

USPC ................... 310/216.069, 216.071
See application file for complete search history.

(56) References Cited

U.S. PATENT DOCUMENTS

2017/0264147 A1  9/2017 Inoue
2022/0294284 A1*  9/2022 Deng ............... H02K 1/165

FOREIGN PATENT DOCUMENTS

| DE | 102006003598 A1 * | 8/2007 | ............ H02K 1/165 |
| EP | 3644492 A1 * | 4/2020 | ............ H02K 1/165 |
| JP | 2017-169248 A | 9/2017 | |
| JP | 2018-099010 A | 6/2018 | |
| JP | 2018-170924 A | 11/2018 | |

\* cited by examiner

*Primary Examiner* — Ahmed Elnakib
*Assistant Examiner* — Minki Chang
(74) *Attorney, Agent, or Firm* — McGinn I.P. Law Group, PLLC

(57) ABSTRACT

A stator for a rotary electric machine includes a stator core and a stator winding. The stator core has a hollow cylindrical shape and includes slots. The stator winding includes segment conductors held in the slots. The slots extending outward in a radial direction from an inner peripheral surface of the stator core. The slots include first and second slots. The second slot is shallower than the first slot. The segment conductors include a segment conductor including a first rectilinear portion held in the first slot, a second rectilinear portion held in the second slot, and a coupler coupling the first rectilinear portion and the second rectilinear portion to each other. The first rectilinear portion and the second rectilinear portion protrude from an end surface of the stator core.

12 Claims, 21 Drawing Sheets

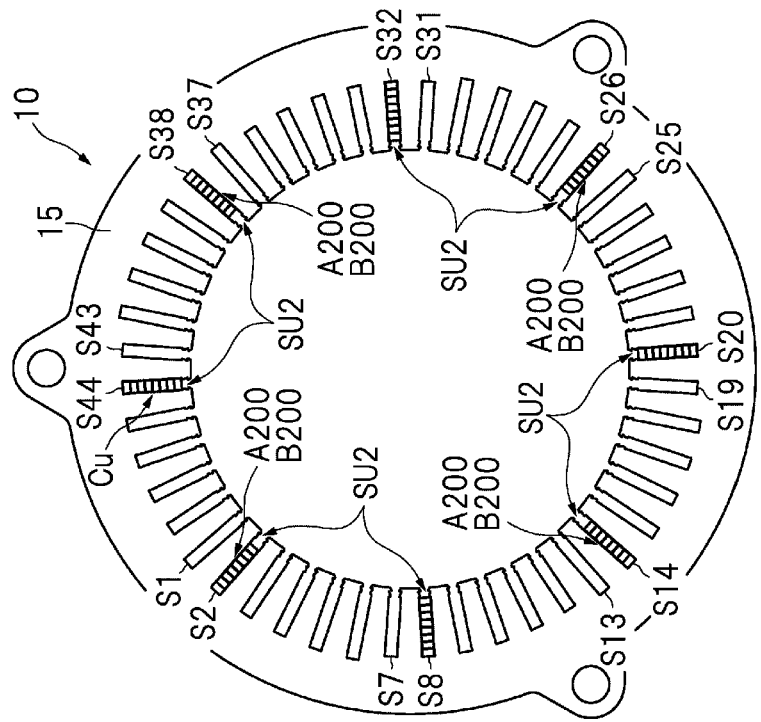
FIG. 10A [U-PHASE SLOT GROUP: SU1]
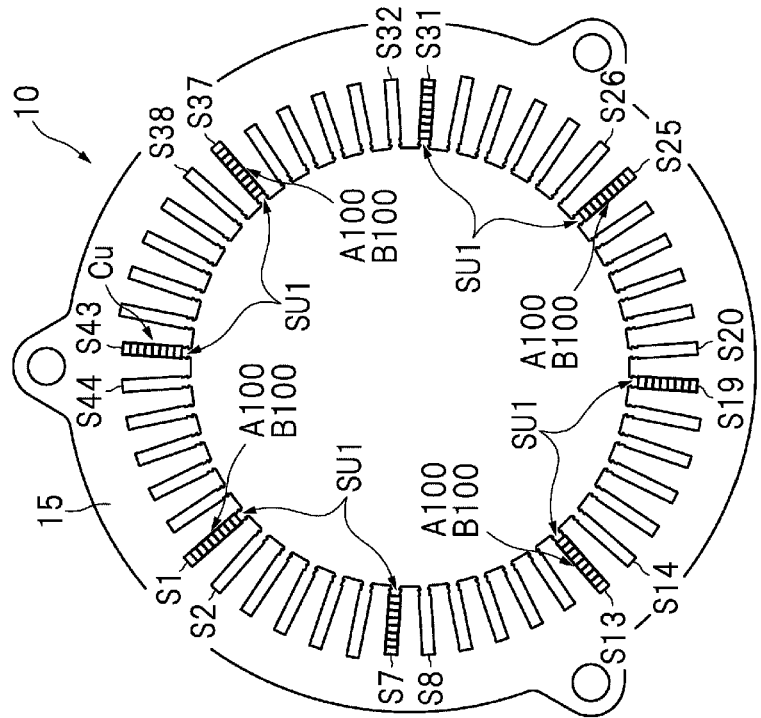
FIG. 10B [U-PHASE SLOT GROUP: SU2]

FIG. 13
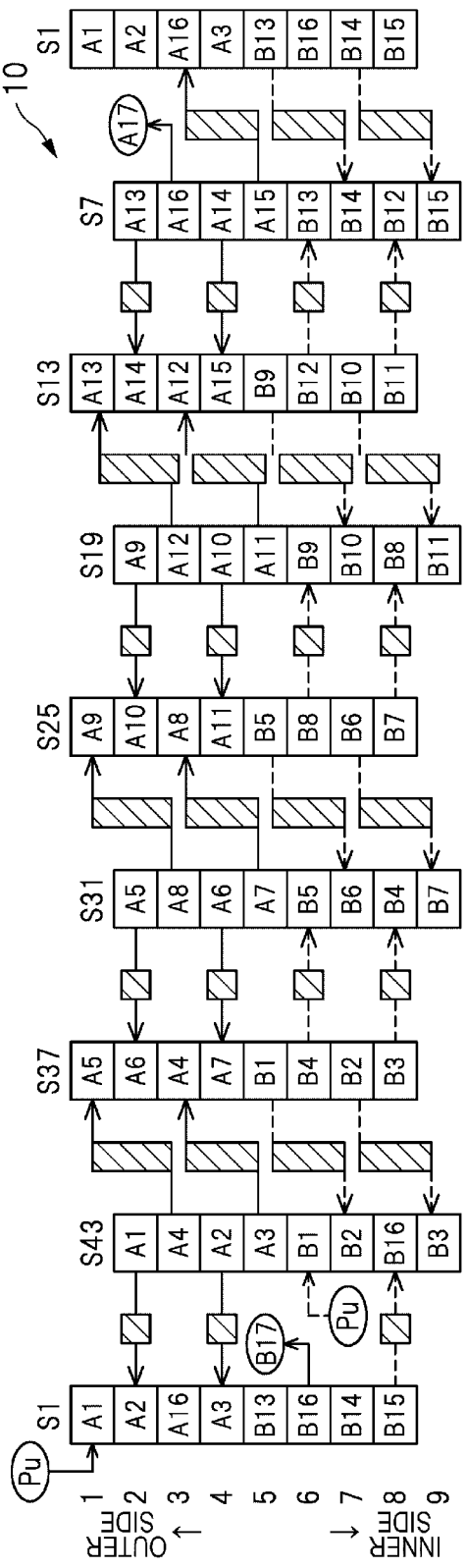
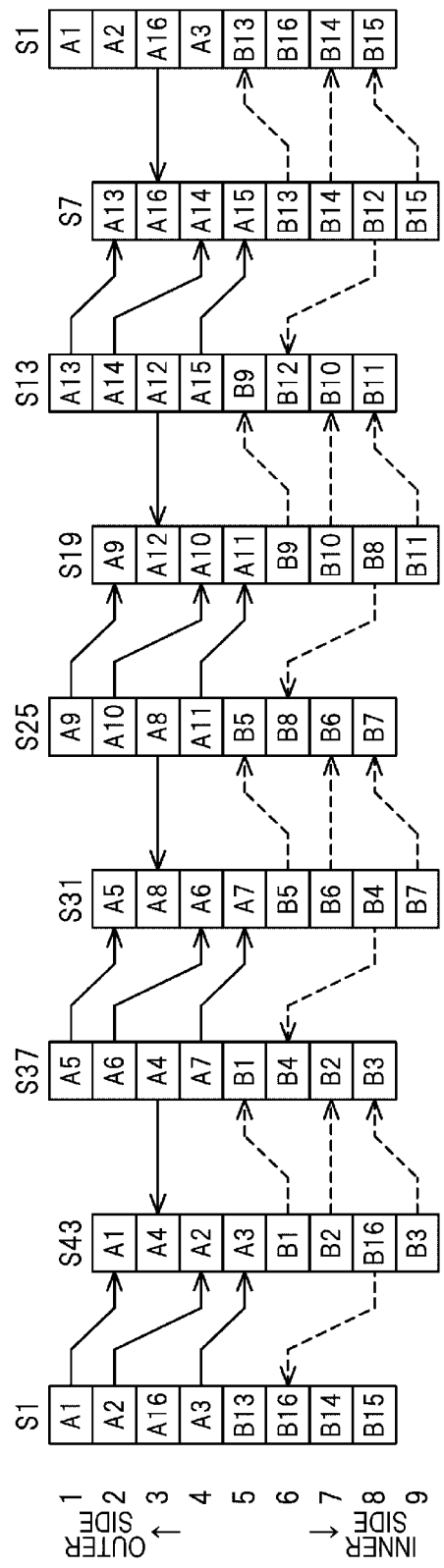

FIG. 14
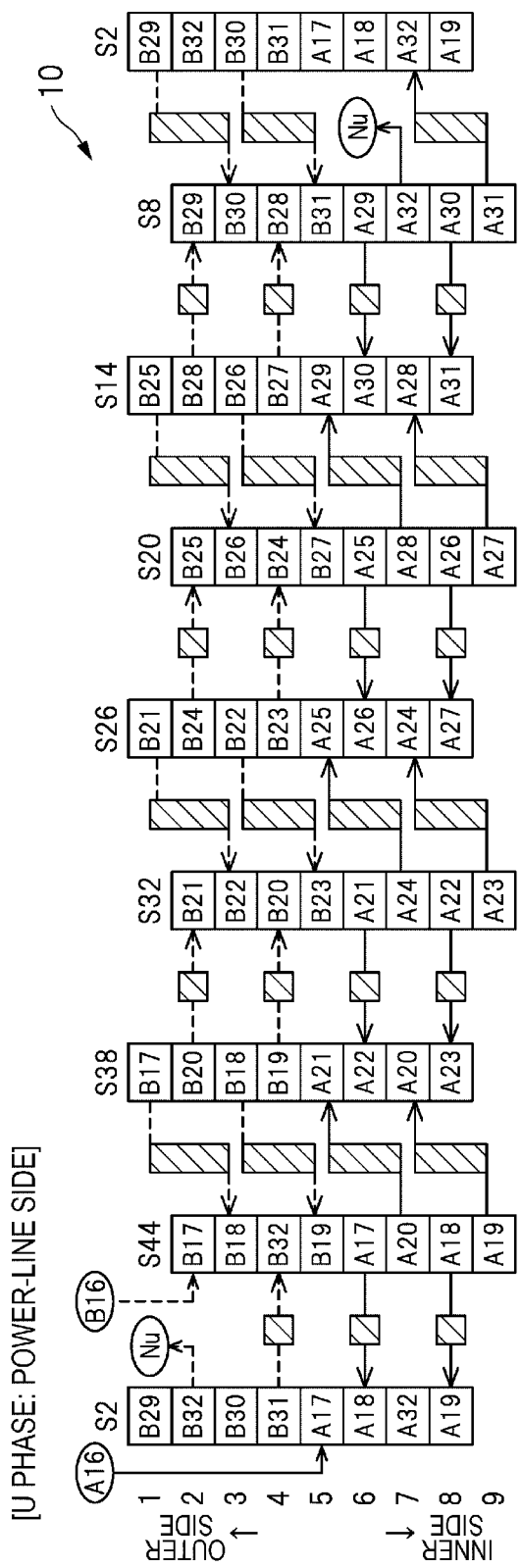
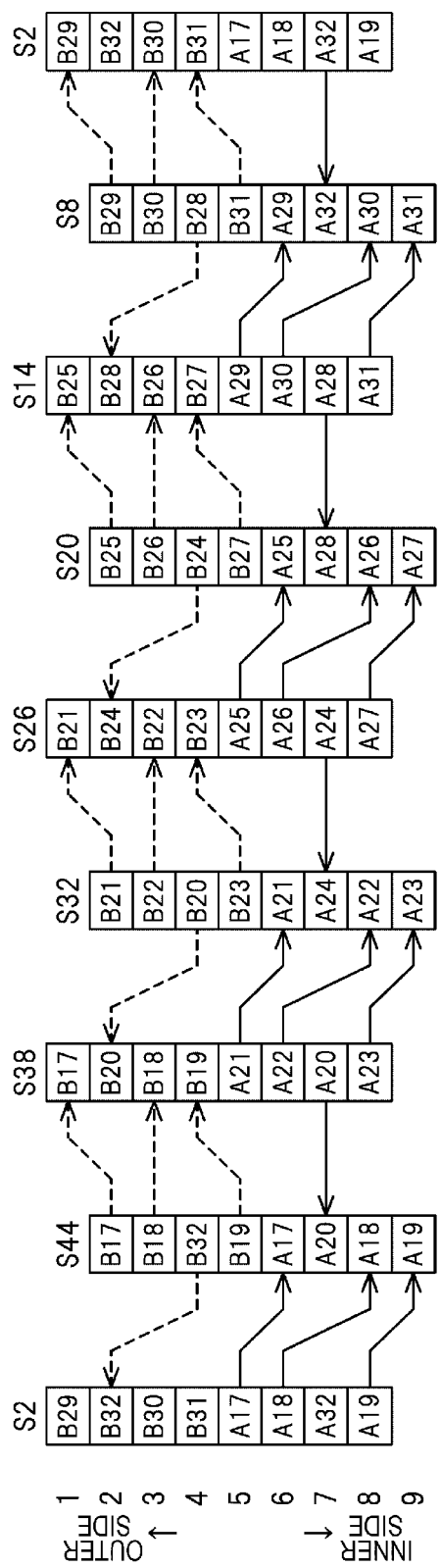

FIG. 15A  [EXAMPLE]
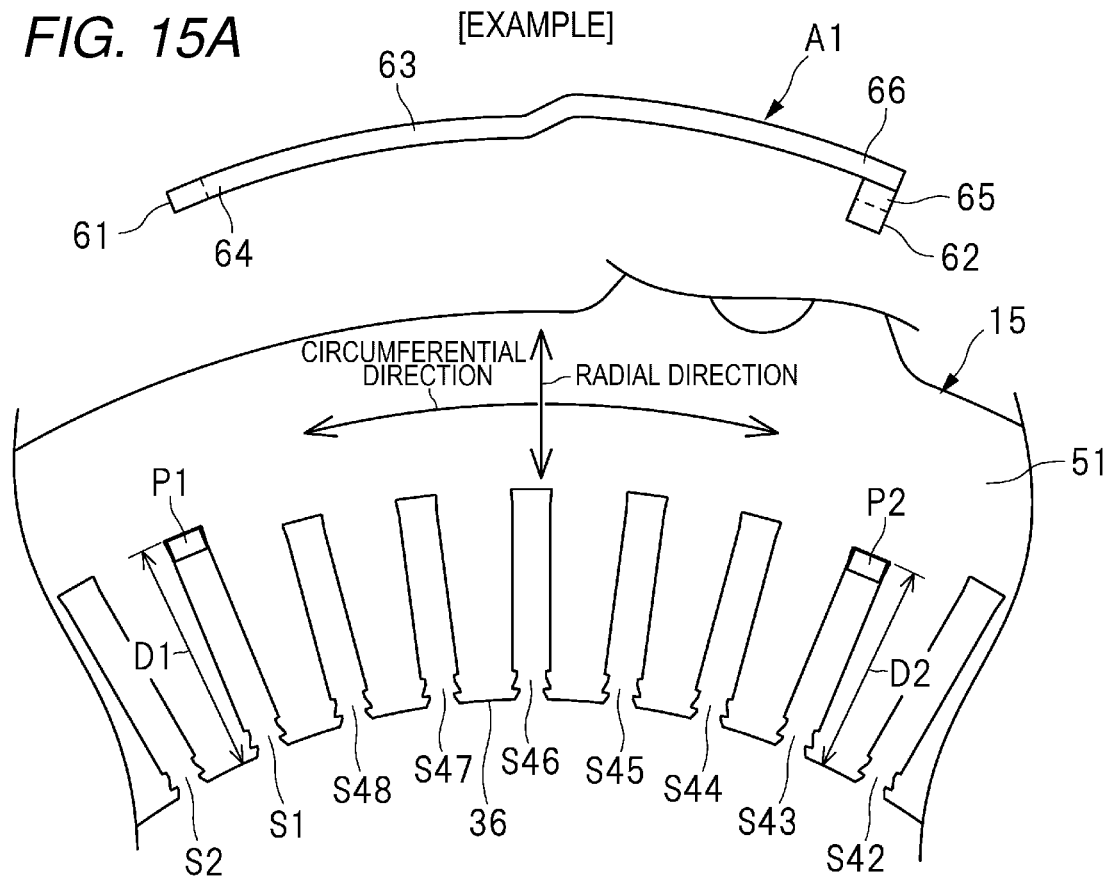
FIG. 15B
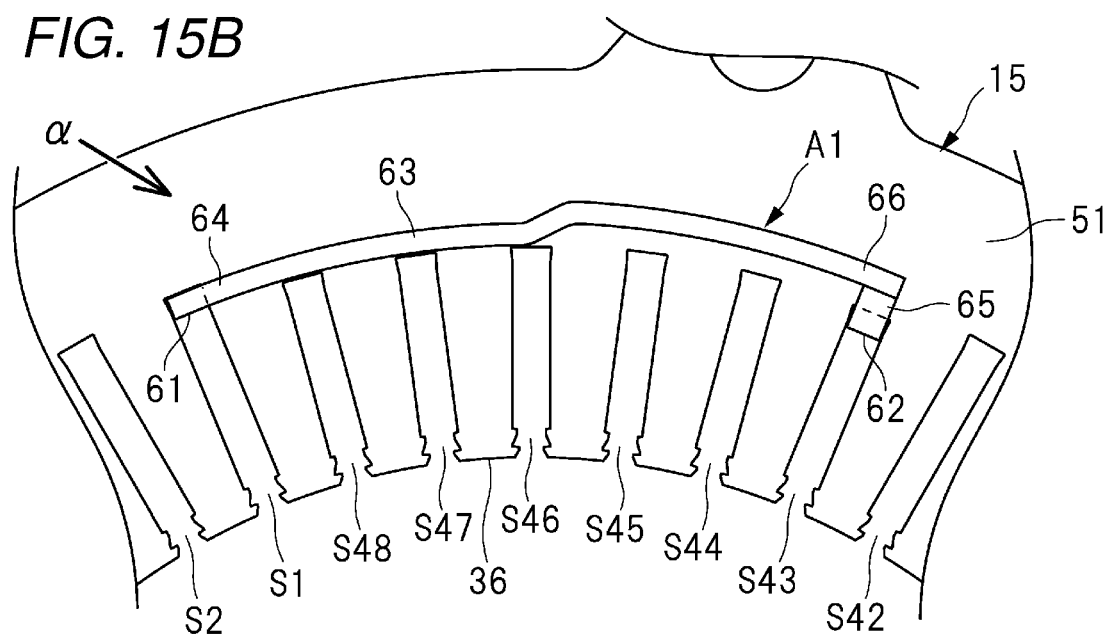

[EXAMPLE]

[COMPARATIVE EXAMPLE]

STATOR

CROSS-REFERENCE TO RELATED APPLICATIONS

The present application claims priority from Japanese Patent Application No. 2020-136171 filed on Aug. 12, 2020 the entire contents of which are hereby incorporated by reference.

BACKGROUND

The disclosure relates to a stator of a rotary electric machine.

A stator of a rotary electric machine, such as an electric motor and a generator, is wound with a stator coil. As such a stator coil, there is proposed a stator coil including substantially U-shaped segment conductors (see Japanese Unexamined Patent Application Publication (JP-A) No. 2017-169248, JP-A No. 2018-99010, and JP-A No. 2018-170924).

SUMMARY

An aspect of the disclosure provides a stator for a rotary electric machine includes a stator core and a stator winding. The stator core has a hollow cylindrical shape and includes slots. The stator winding includes segment conductors held in the slots. The slots extending outward in a radial direction from an inner peripheral surface of the stator core. The slots include a first slot and a second slot. The second slot is shallower than the first slot. The segment conductors include a segment conductor including a first rectilinear portion held in the first slot, a second rectilinear portion held in the second slot, and a coupler coupling the first rectilinear portion and the second rectilinear portion to each other. The first rectilinear portion and the second rectilinear portion protrude from an end surface of the stator core.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 10A is a diagram illustrating an example of a U-phase slot group where the U-phase coil is partly held.

FIG. 10B is a diagram illustrating an example of a U-phase slot group where the U-phase coil is partly held.

FIG. 13 is a diagram illustrating holding positions of the segment coils in the slots of the stator core.

FIG. 14 is a diagram illustrating holding positions of the segment coils in the slots of the stator core.

FIG. 15A is a diagram illustrating a state of the stator core and the segment coil being separated from each other.

FIG. 15B is a diagram illustrating a state of the stator core and the segment coil being assembled together.

DETAILED DESCRIPTION

Segment conductors that constitute a stator coil are bent in a complicated shape in many cases. However, an increase in the number of bends of each segment conductor causes an increase in the number of processing steps of the segment conductor, thus raising the cost of a stator. In view of this, the number of bends of the segment conductor is decreased to lower the cost of the stator.

It is desirable to lower the cost of the stator.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, as an exemplary rotary electric machine 11 including a stator 10 according to the embodiment of the disclosure, a three-phase alternating current synchronous motor-generator mounted on an electric vehicle, a hybrid vehicle, and other vehicles will be given. However, this is not to be construed in a limiting sense. Any rotary electric machine may be applied insofar as the rotary electric machine includes the stator 10 where segment coils 40 are assembled.

Configuration of Rotary Electric Machine

Figure 1:
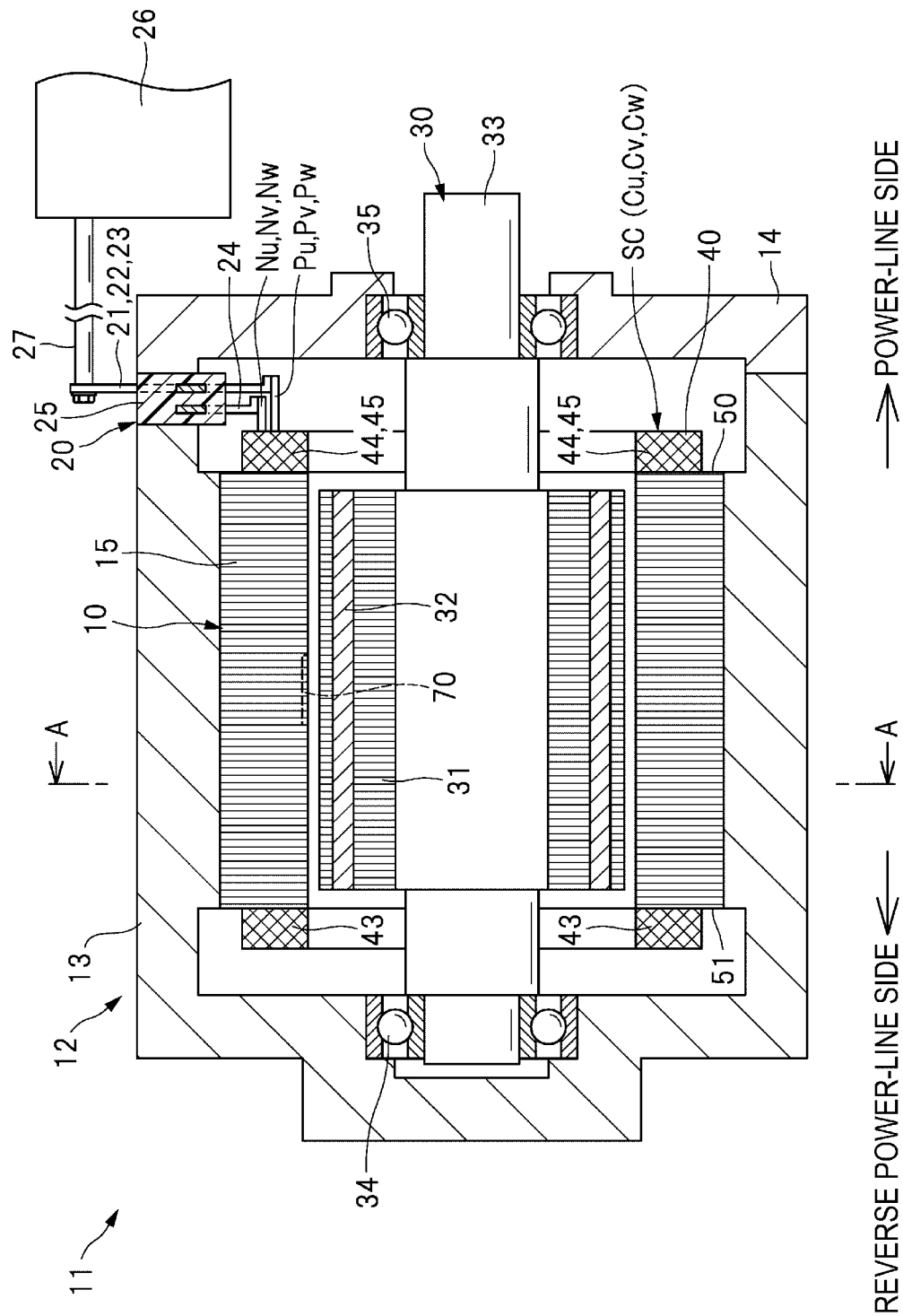
FIG. 1 is a cross-sectional view of an example of a rotary electric machine including a stator according to an embodiment of the disclosure.

FIG. 1 is a cross-sectional view of an example of the rotary electric machine 11 including the stator 10 according to the embodiment of the disclosure. As illustrated in FIG. 1, the rotary electric machine 11 is a motor-generator and includes a motor housing 12. The motor housing 12 includes a housing body 13 of a bottomed, hollow cylindrical shape, and an end cover 14 that closes an open end of the housing body 13. The stator 10 is secured in the housing body 13 and includes a stator core 15 of a hollow cylindrical shape including plural silicon steel sheets, for example, and a three-phase stator coil SC wound on the stator core 15. In one embodiment, the stator coil SC may serve as a "stator winding".

A bus bar unit 20 is coupled to the stator coil SC. This bus bar unit 20 includes three power bus bars 21, 22, and 23 coupled to three power points Pu, Pv, and Pw of the stator coil SC, a neutral bus bar 24 that couples three neutral points Nu, Nv, and Nw of the stator coil SC to one another, and an insulating member 25 to hold these bus bars 21, 22, 23, and 24. End portions of the power bus bars 21, 22, and 23 protrude outward from the motor housing 12, and a power cable 27 extending from an inverter 26, for example, is coupled to each of the power bus bars 21, 22, and 23.

A rotor 30 of a solid cylindrical shape is rotatably accommodated in a center of the stator core 15. This rotor 30 includes a rotor core 31 of a hollow cylindrical shape including plural silicon steel sheets, for example, plural permanent magnets 32 buried in the rotor core 31, and a rotor shaft 33 secured in a center of the rotor core 31. One end of the rotor shaft 33 is supported by a bearing 34 disposed on the housing body 13, and the other end of the rotor shaft 33 is supported by a bearing 35 disposed on the end cover 14.

Configuration of Stator

Figure 2:
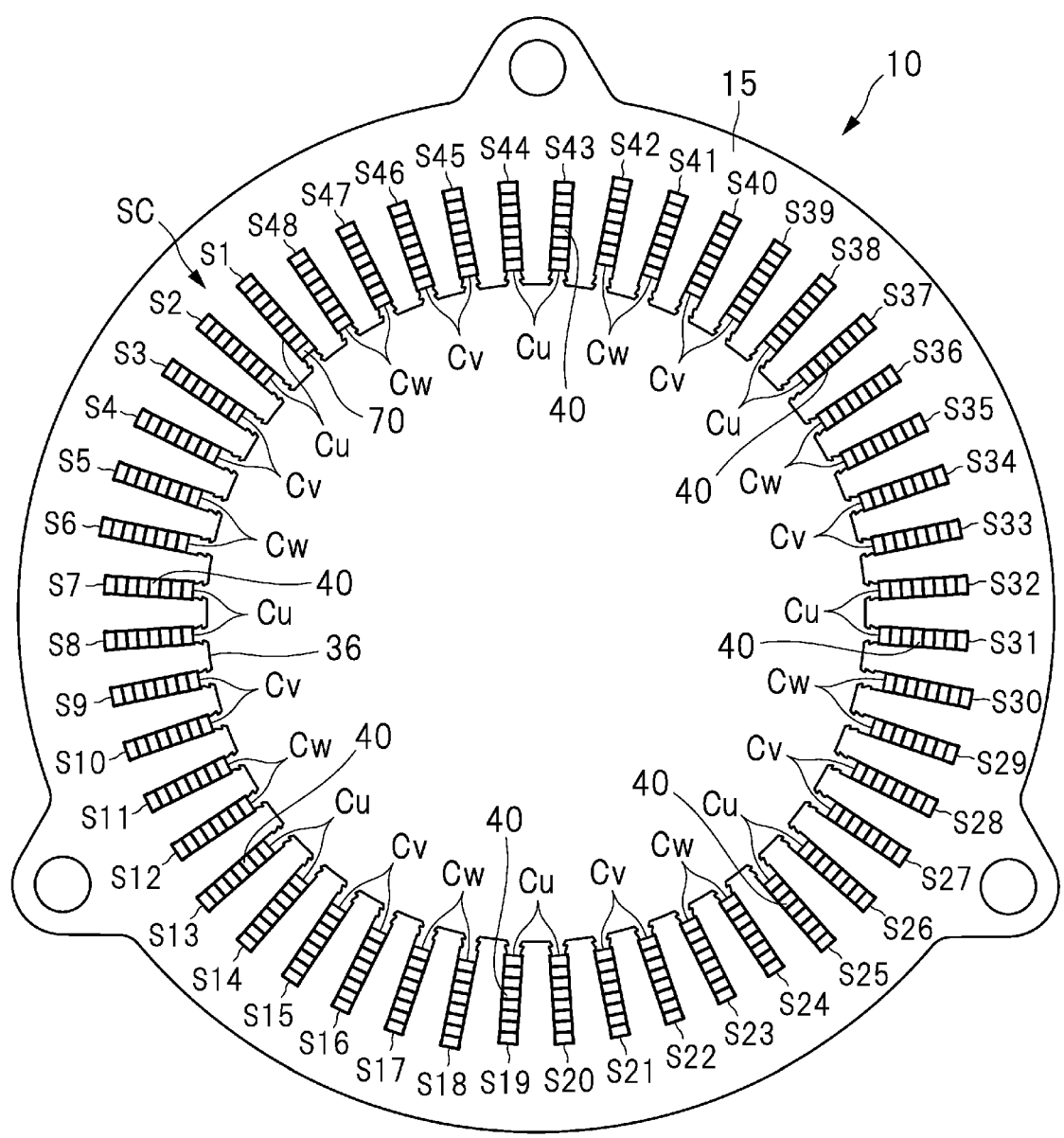
FIG. 2 is a cross-sectional view of the stator taken along line A-A in FIG. 1.
Figure 3:
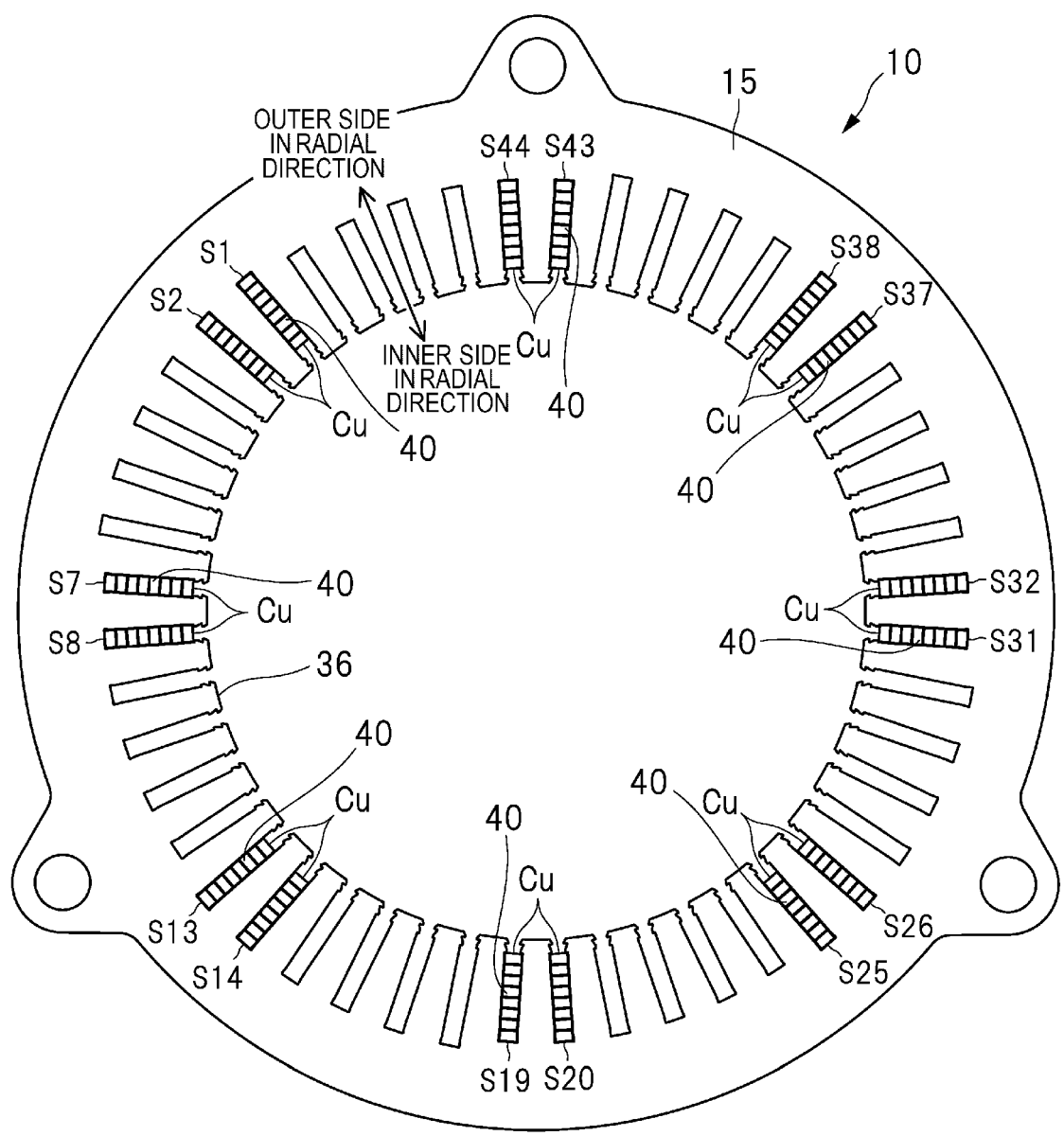
FIG. 3 is a cross-sectional view of a stator core including a U-phase coil.
Figure 4:
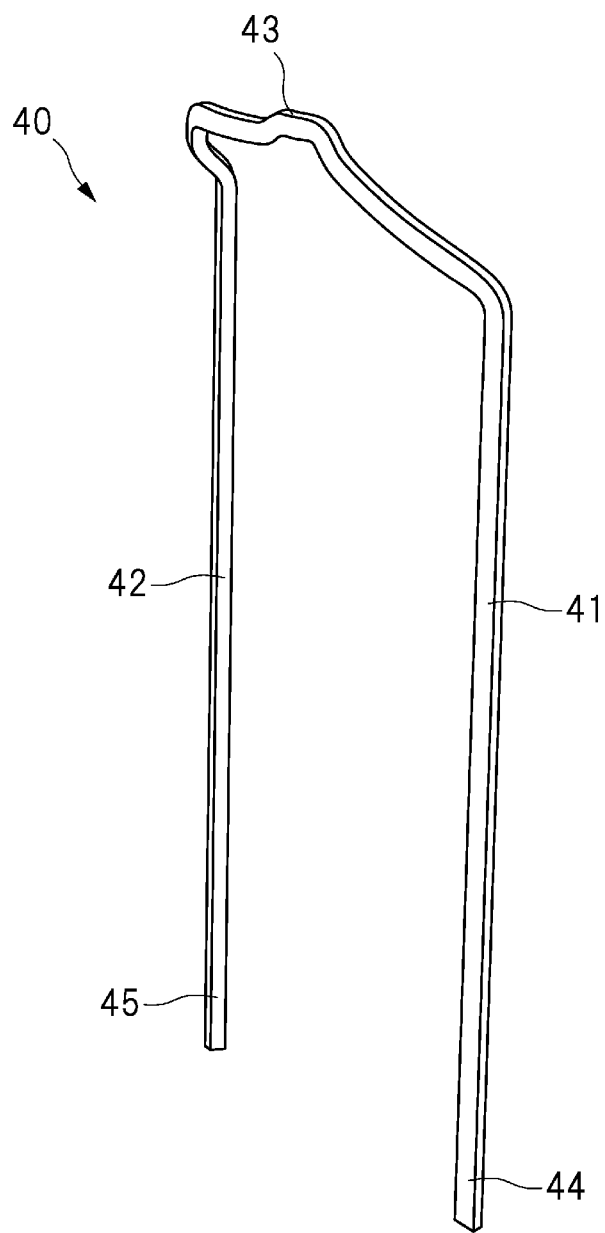
FIG. 4 is a perspective view of an example of a segment coil.

FIG. 2 is a cross-sectional view of the stator 10 taken along line A-A in FIG. 1. FIG. 3 is a cross-sectional view of the stator core 15 including a phase winding of a U phase (hereinafter referred to as U-phase coil Cu). FIG. 4 is a perspective view of one of the segment coils 40 as an example. As described later, the stator coil SC includes a phase winding of a V phase (hereinafter referred to as V-phase coil Cv) and a phase winding of a W phase (hereinafter referred to as W-phase coil Cw) as well as the U-phase coil Cu. It is noted that the U-phase coil Cu, the V-phase coil Cv, and the W-phase coil Cw in the drawings have an identical coil configuration.

As illustrated in FIG. 2, plural slots S1 to S48 are formed in an inner peripheral surface 36 of the stator core 15 of the hollow cylindrical shape at predetermined intervals in a circumferential direction. As described later, the slots S1 to S48 of the stator core 15 include deep first slots S1 to S6, S13 to S18, S25 to S30, and S37 to S42, and shallow second slots S7 to S12, S19 to S24, S31 to S36, and S43 to S48. The plural segment coils 40 are held in each of the slots S1 to S48. These segment coils 40 are coupled to one another to constitute the stator coil SC. In one embodiment, the segment coils 40 may serve as "segment conductors". As illustrated in FIGS. 2 and 3, the segment coils 40 that constitute the U-phase coil Cu are held in the slots S1, S2, S7, S8 . . . . As illustrated in FIG. 2, the segment coils 40 that constitute the V-phase coil Cv are held in the slots S3, S4, S9, S10 . . . , and the segment coils 40 that constitute the W-phase coil Cw are held in the slots S5, S6, S11, S12 . . . .

As illustrated in FIG. 4, each of the segment coils 40 bent substantially in the U shape includes a coil side 41 held in one of the slots (e.g., the slot S1), and a coil side 42 held in another slot (e.g., the slot S7) at a predetermined coil pitch. In one embodiment, the coil side 41 may serve as a "first rectilinear portion", and the coil side 42 may serve as a "second rectilinear portion". The segment coil 40 also includes an end portion 43 that couples the pair of coil sides 41 and 42 to each other, and joint end portions 44 and 45 that respectively extend from the pair of coil sides 41 and 42. In one embodiment, the end portion 43 may serve as a "coupler". It is noted that the segment coil 40 is made of a rectangular wire of a conductive material such as copper, and that the segment coil 40 except distal ends of the joint end portions 44 and 45 is coated with an insulating film of enamel, resin or the like. The end portion 43 of the segment coil 40 is not limited to a bent shape illustrated in FIG. 4 but is bent in various shapes in accordance with an assembling position with respect to the stator core 15.

Figure 5:
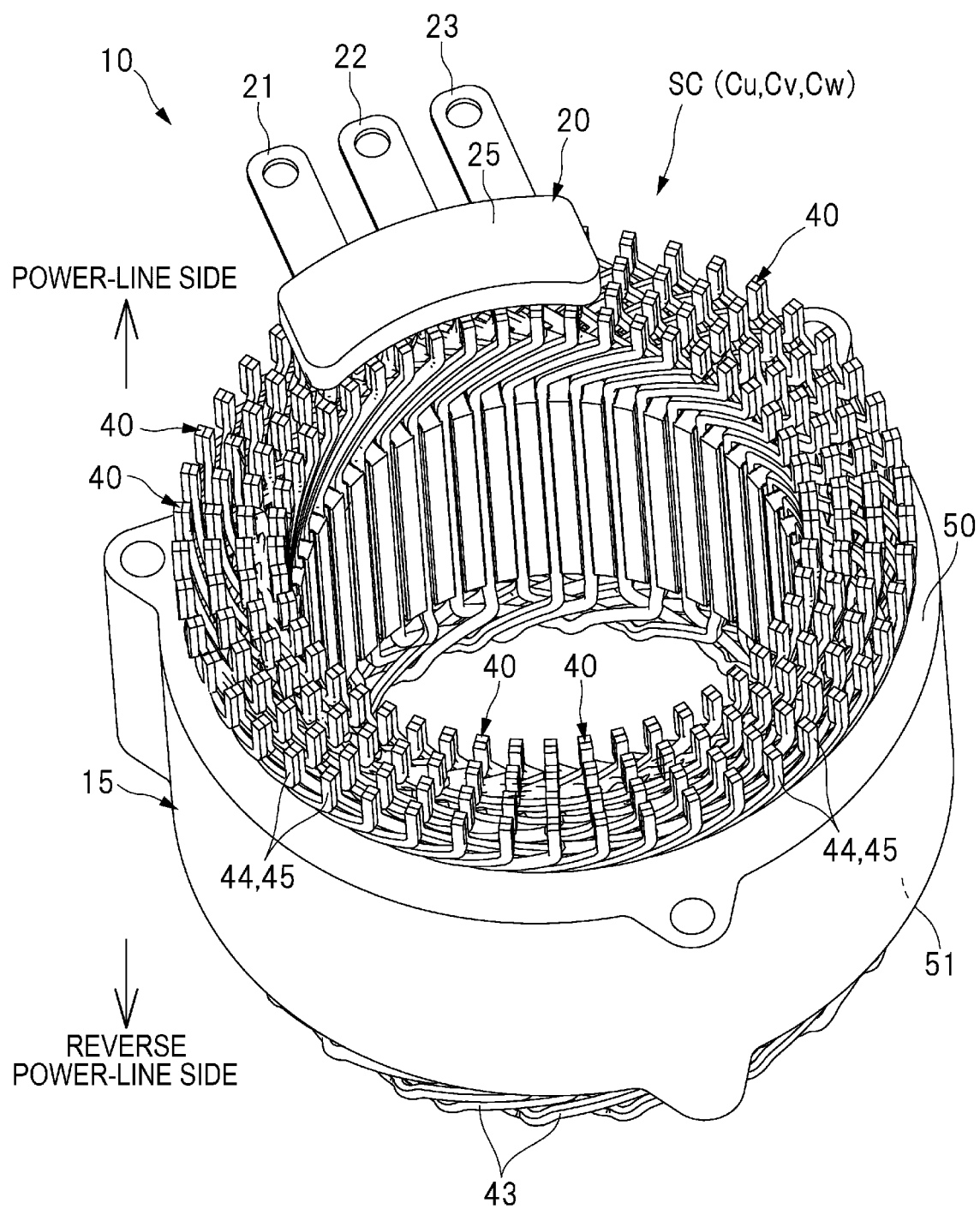
FIG. 5 is a perspective view of the stator.
Figure 6:
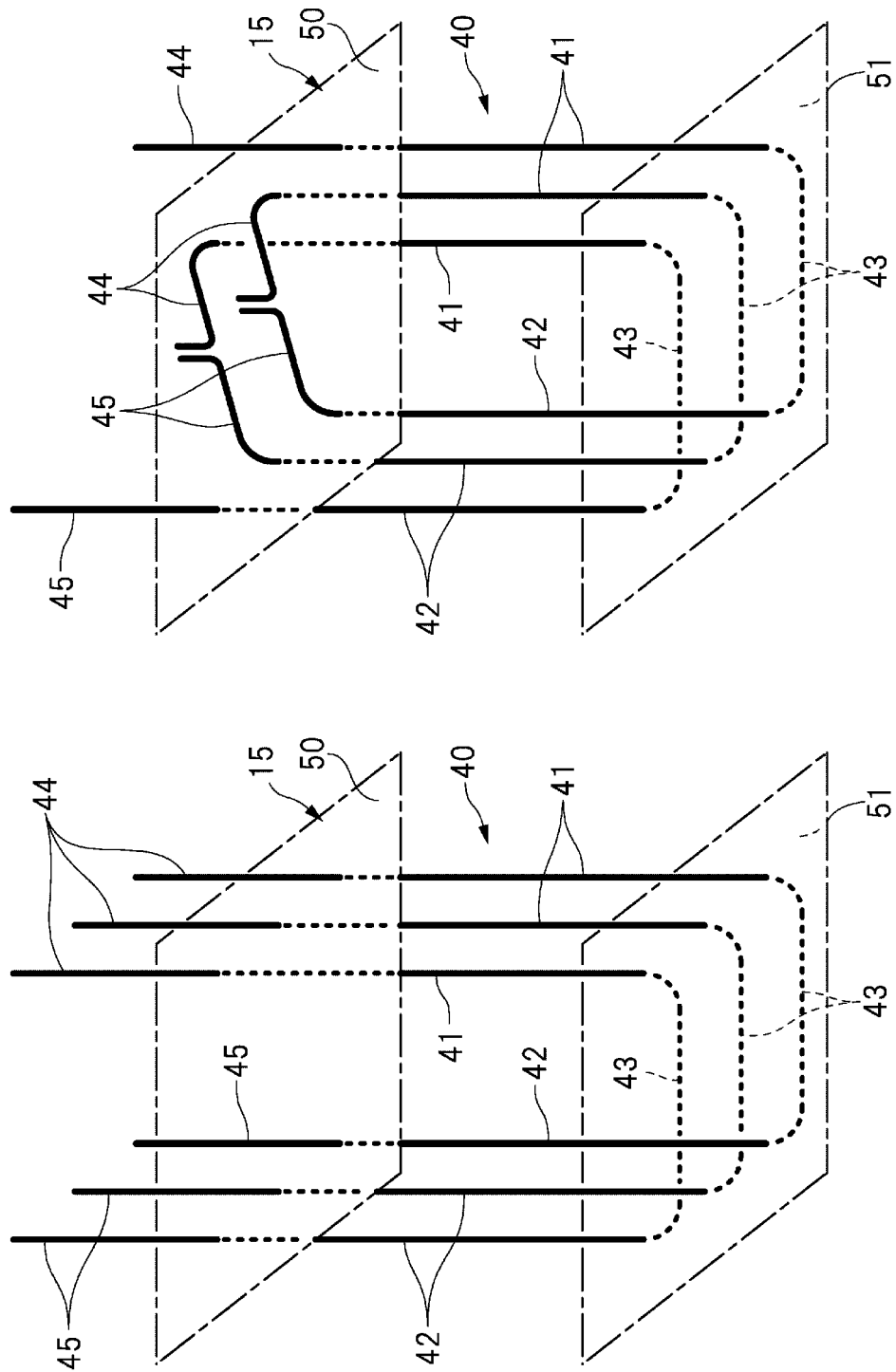
FIGS. 6A and 6B are diagrams illustrating an example of a coupling state of the segment coils.

FIG. 5 is a perspective view of the stator 10. FIGS. 6A and 6B are diagrams illustrating an example of a coupling state of the segment coils 40. As illustrated in FIGS. 2 and 5, the plural segment coils 40 are assembled in each of the slots S1 to S48 of the stator core 15. As illustrated in FIGS. 5, 6A, and 6B, when the segment coils 40 are assembled in the stator core 15, the joint end portions 44 and 45 of the segment coils 40 protrude from an end surface 50 of the stator core 15 on one side to a power-line side, and the end portions 43 of the segment coils 40 protrude from an end surface 51 of the stator core 15 on the other side to a reverse power-line side.

As illustrated in FIGS. 6A and 6B, the joint end portions 44 and 45 that protrude from the end surface 50 of the stator core 15 are bent to come into contact with the joint end portions 44 and 45 of other segment coils 40 and thereafter welded to the joint end portions 44 and 45 of the other segment coils 40 in contact. Thus, the plural segment coils 40 constitute the U-phase coil Cu, the plural segment coils 40 constitute the V-phase coil Cv, and the plural segment coils 40 constitute the W-phase coil Cw. It is noted that the joint end portions 44 and 45 after welded undergo insulating processing to form a resin film, for example, to coat the conductor.

Configuration of Stator Coil (Circulating Current Prevention)

Figure 7:
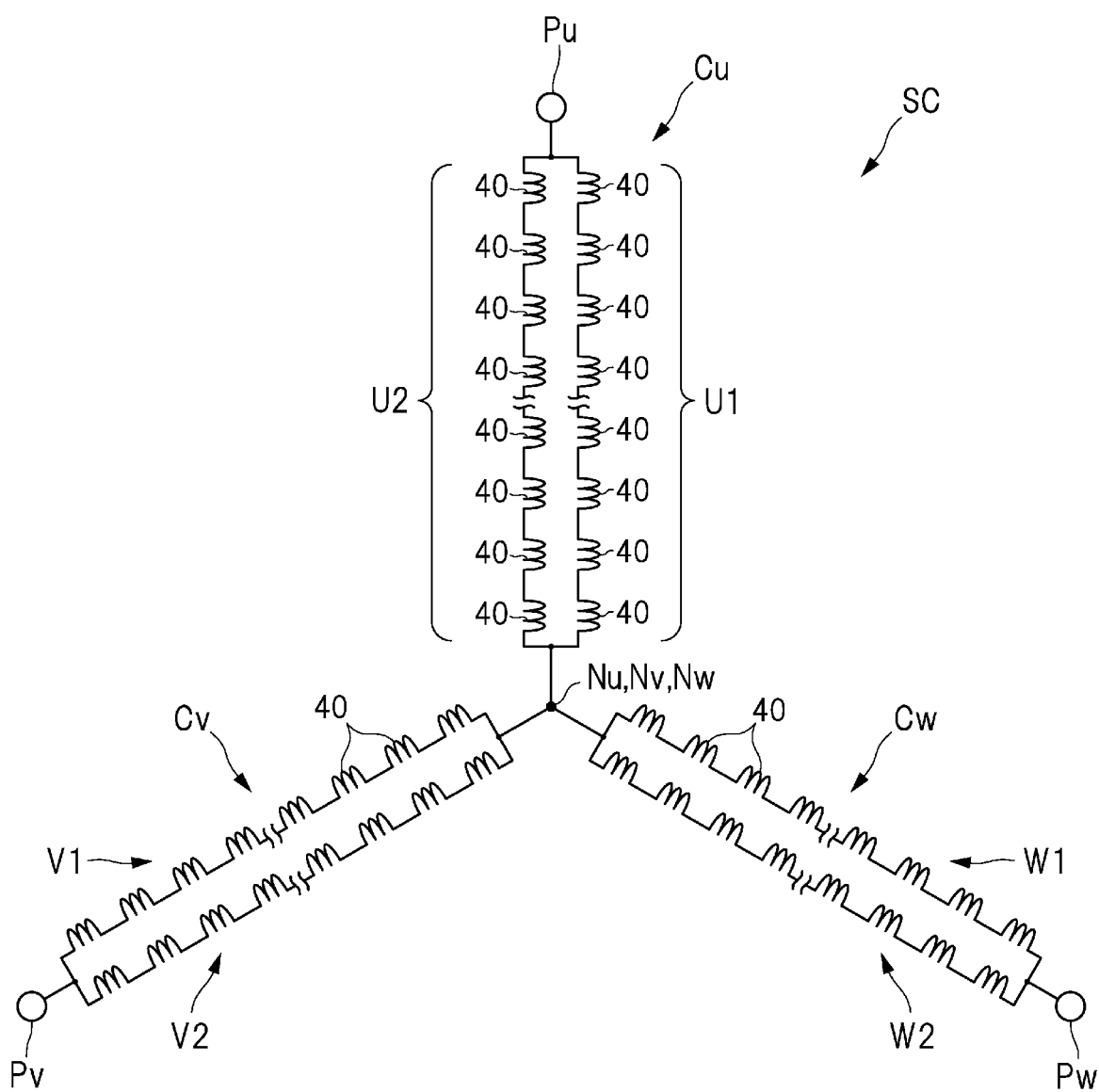
FIG. 7 is a diagram illustrating an example of a connection state of a stator coil.

FIG. 7 is a diagram illustrating an example of a connection state of the stator coil SC. As illustrated in FIG. 7, the U-phase coil Cu, the V-phase coil Cv, and the W-phase coil Cw constitute the stator coil SC. The U-phase coil Cu includes a pair of series coil groups U1 and U2 connected to each other in parallel. Each of the series coil groups U1 and U2 includes the plural segment coils 40 in series connection. The V-phase coil Cv includes a pair of series coil groups V1 and V2 connected to each other in parallel. Each of the series coil groups V1 and V2 includes the plural segment coils 40 in series connection. The W-phase coil Cw includes a pair of series coil groups W1 and W2 connected to each other in parallel. Each of the series coil groups W1 and W2 includes the plural segment coils 40 in series connection. One end of each of the phase coils Cu, Cv, and Cw serves as a power point Pu, Pv, and Pw, and the other end of each of the phase coils Cu, Cv, and Cw serves as a neutral point Nu, Nv, and Nw. The neutral point Nu of the U-phase coil Cu, the neutral point Nv of the V-phase coil Cv, and the neutral point Nw of the W-phase coil Cw are coupled to one another. These phase coils Cu, Cv, and Cw constitute the stator coil SC.

Figure 8:
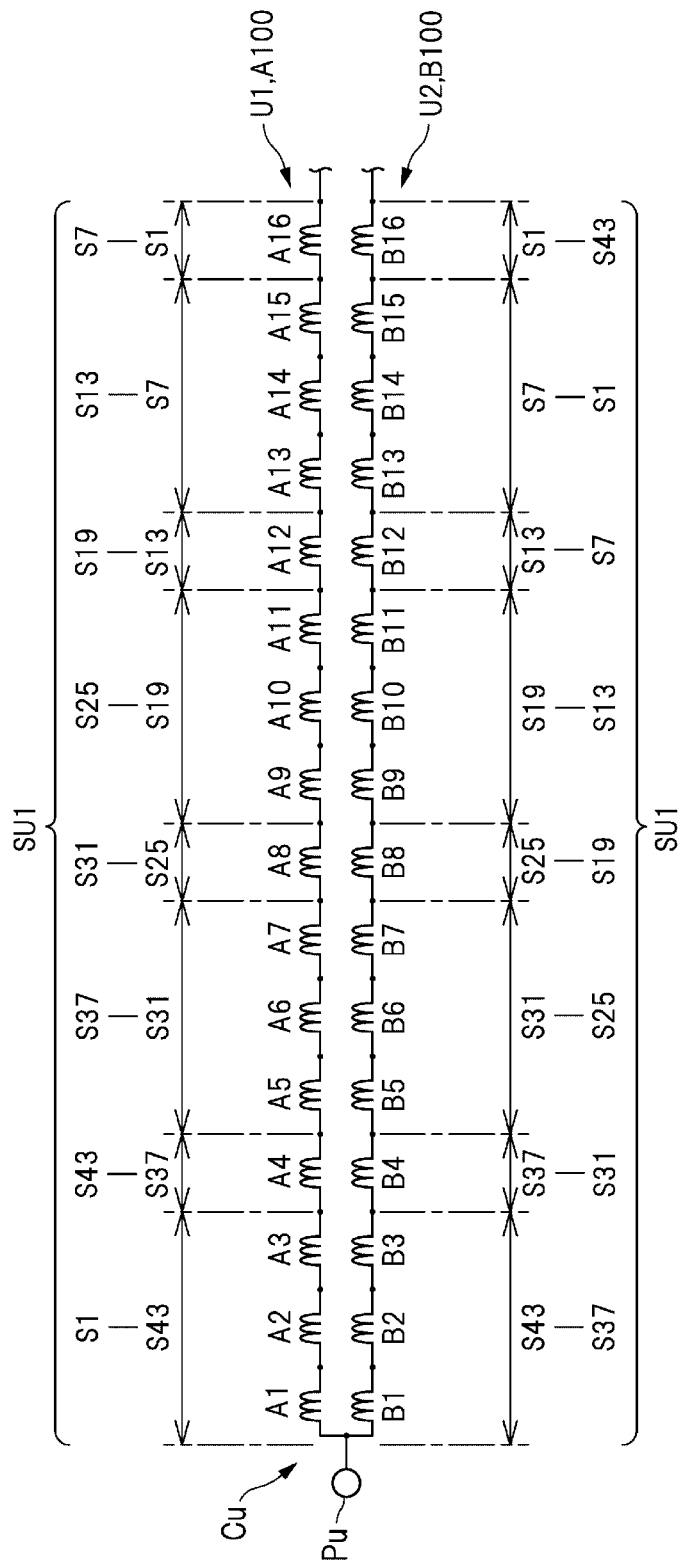
FIG. 8 is a diagram illustrating an example of a coil configuration of the U-phase coil.
Figure 9:
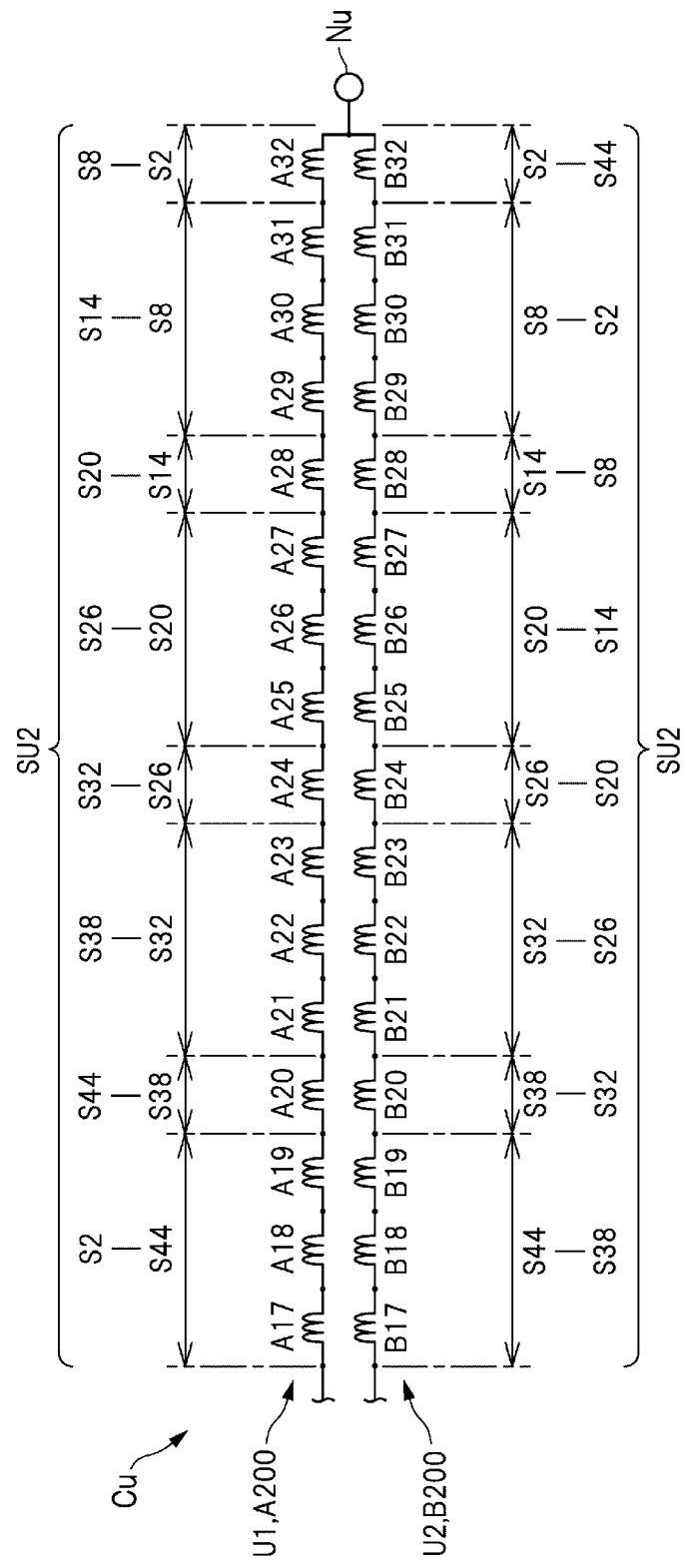
FIG. 9 is a diagram illustrating an example of the coil configuration of the U-phase coil.
Figure 11:
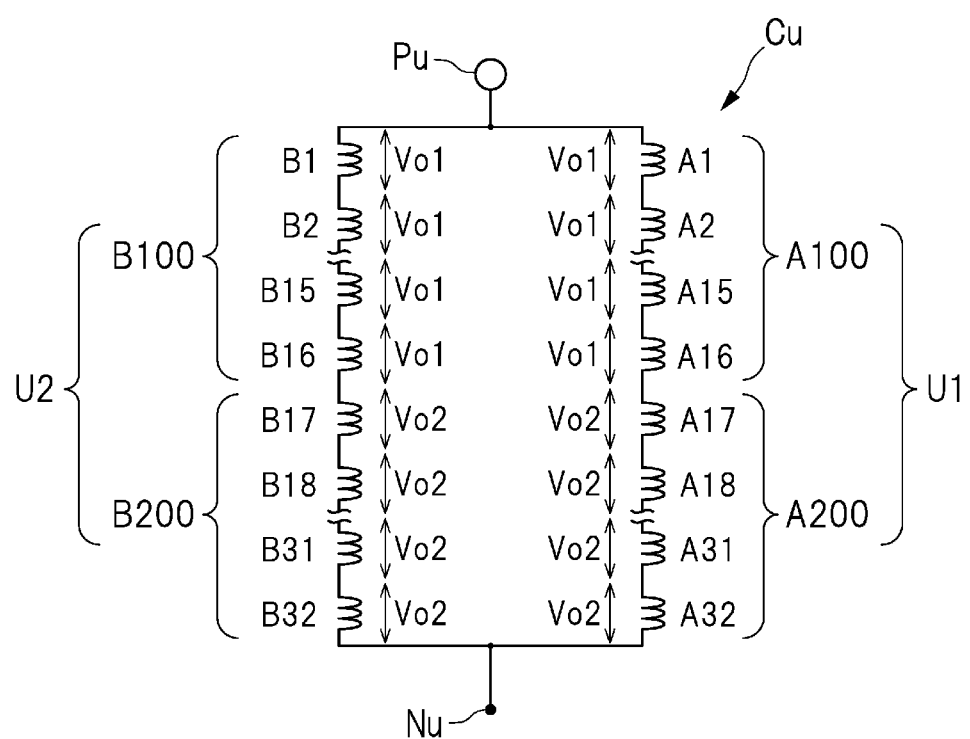
FIG. 11 is a diagram illustrating a generation state of induction voltages in the U-phase coil.

FIGS. 8 and 9 are diagrams illustrating examples of coil configurations of the U-phase coil Cu. It is noted that although the segment coils are denoted by a reference symbol "40" in the preceding description, the segment coils will be denoted by reference symbols "A1 to A32 and B1 to B32" in the following description in order to discriminate the individual segment coils. In FIGS. 8 and 9, segment coils A16 and A17 are connected to each other in series, and segment coils B16 and B17 are connected to each other in series. FIG. 10A is a diagram illustrating an example of a U-phase slot group SU1 where the U-phase coil Cu is partly held. FIG. 10B is a diagram illustrating an example of a U-phase slot group SU2 where the U-phase coil Cu is partly held. FIG. 11 is a diagram illustrating a generation state of induction voltages Vo1 and Vo2 in the U-phase coil Cu.

As illustrated in FIGS. 8 and 9, the U-phase coil Cu includes the pair of series coil groups U1 and U2 connected to each other in parallel. One of the series coil groups U1 includes plural segment coils A1 to A32 connected to each other in series. The other of the series coil groups U2 includes plural segment coils B1 to B32 connected to each other in series. The series coil group U1 includes a first coil group A100 and a second coil group A200. The first coil group A100 includes the segment coils A1 to A16 held in the U-phase slot group SU1. The second coil group A200 includes the segment coils A17 to A32 held in the U-phase slot group SU2. Similarly, the series coil group U2 includes a first coil group B100 and a second coil group B200. The first coil group B100 includes the segment coils B1 to B16 held in the U-phase slot group SU1. The second coil group B200 includes the segment coils B17 to B32 held in the U-phase slot group SU2.

As illustrated in FIG. 10A, the U-phase slot group SU1 where the first coil groups A100 and B100 are held includes the plural slots S1, S7, S13, S19, S25, S31, S37, and S43 disposed at regular intervals (of 45°, for example) in the circumferential direction of the stator core 15. As illustrated in FIG. 10B, the U-phase slot group SU2 where the second coil groups A200 and B200 are held includes the plural slots S2, S8, S14, S20, S26, S32, S38, and S44 disposed at regular intervals (of 45°, for example) in the circumferential direction of the stator core 15.

Since positions of the U-phase slot groups SU1 and SU2 are displaced from each other in the circumferential direction in this manner, the induction voltage Vo1 generated in the first coil groups A100 and B100 inserted in the U-phase slot group SU1 and the induction voltage Vo2 generated in the second coil groups A200 and B200 inserted in the U-phase slot group SU2 change periodically while having phases displaced from each other. Consequently, the first coil groups A100 and B100 constitute the series coil group, and the second coil groups A200 and B200 constitute the series coil group so that when these series coil groups are connected in parallel, the series coil groups have a potential difference to cause a circulating current to flow.

In view of this, in the U-phase coil Cu of the stator 10, to prevent the circulating current from being generated due to the induction voltages, the first and second coil groups A100 and A200 are combined into the series coil group U1 that constitutes one side of a parallel circuit, and the first and second coil groups B100 and B200 are combined into the series coil group U2 that constitutes the other side of the parallel circuit. The series coil groups U1 and U2 have this configuration. Consequently, as illustrated in FIG. 11, in the series coil group U1, the induction voltage Vo1 is generated in each of the segment coils A1 to A16 that constitute the first coil group A100, and the induction voltage Vo2 is generated in each of the segment coils A17 to A32 that constitute the second coil group A200. In the series coil group U2, the induction voltage Vo1 is generated in each of the segment coils B1 to B16 that constitute the first coil group B100, and the induction voltage Vo2 is generated in each of the segment coils B17 to B32 that constitute the second coil group B200.

In this manner, the coil groups A100 and A200 are combined into the series coil group U1, and the coil groups B100 and B200 are combined into the series coil group U2 so as to eliminate the potential difference between the series coil group U1 and the series coil group U2. Thus, the circulating current can be prevented from being generated in the U-phase coil Cu. Moreover, in the V-phase coil Cv and the W-phase coil Cw of substantially the same coil configuration, circulating currents can be prevented from being generated. As a result, generation of the circulating currents in the stator coil SC can be prevented to enhance energy efficiency of the rotary electric machine 11.

Segment Coils That Constitute U-Phase Coil

Figure 12:
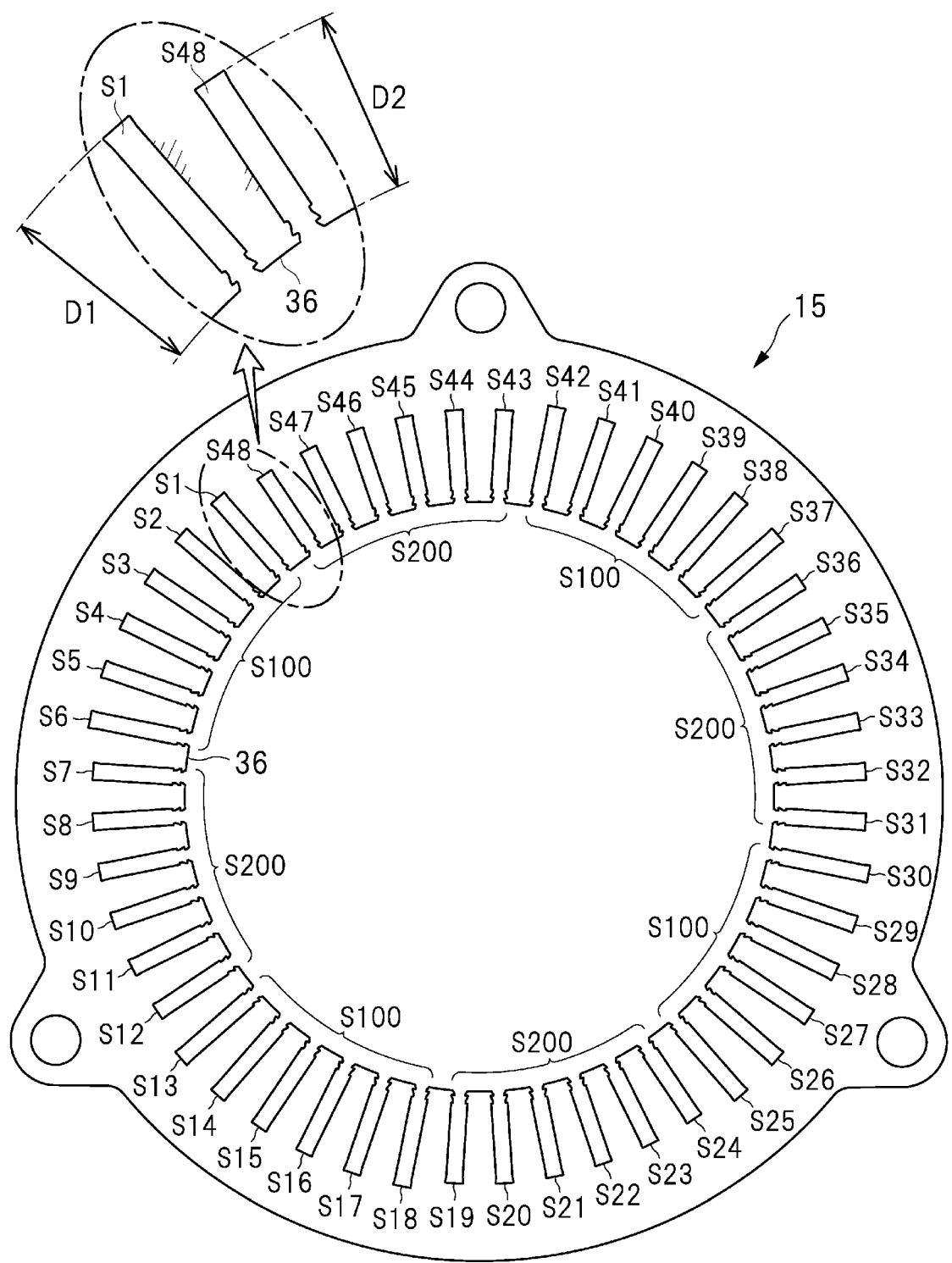
FIG. 12 is a diagram illustrating the stator core as a single body.

Next, the segment coils that constitute the U-phase coil Cu will be described in more detail. FIG. 12 is a diagram illustrating the stator core 15 as a single body. FIG. 13 is a diagram illustrating holding positions of the segment coils A1 to A16 and B1 to B16 in the slots S1, S7 . . . of the stator core 15. FIG. 14 is a diagram illustrating holding positions of the segment coils A17 to A32 and B17 to B32 in the slots S2, S8 . . . of the stator core 15.

The "power-line side" illustrated in FIGS. 13 and 14 refers to a side where the joint end portions 44 and 45 of the segment coils 40 are located, that is, a side where the power points Pu, Pv, and Pw are located as illustrated in FIGS. 1 and 5. The "reverse power-line side" illustrated in FIGS. 13 and 14 refers to a side opposite to the power-line side, that is, a side where the end portions 43 of the segment coils 40 are located as illustrated in FIGS. 1 and 5. As illustrated in FIG. 3, an "inner side" illustrated in FIGS. 13 and 14 refers to an inner side of the stator core 15 in the radial direction, and an "outer side" illustrated in FIGS. 13 and 14 refers to an outer side of the stator core 15 in the radial direction. It is noted that directions of arrows in FIGS. 13 and 14 refer to directions from the power point Pu to the neutral point Nu.

As illustrated in FIG. 12, in the stator core 15 of the hollow cylindrical shape, the plural slots S1 to S48 are formed and extend outward in the radial direction from an inner peripheral surface 36. These slots S1 to S48 constitute first slot groups S100 and second slot groups S200 alternately arranged in the circumferential direction of the stator core 15. The first slot groups S100 include first slots having a depth D1. The deep first slots having the depth "D1" include the slots S1 to S6, S13 to S18, S25 to S30, and S37 to S42. The second slot groups S200 include second slots having a depth D2 less than the depth D1. The shallow second slots having the depth "D2" include the slots S7 to S12, S19 to S24, S31 to S36, and S43 to S48.

Series Coil Group U1

The series coil group U1 that constitutes part of the U-phase coil Cu will be described. As illustrated in FIG. 8, the first coil group A100 that constitutes the series coil group U1 has a coil configuration where a connection pattern of four segment coils (e.g., A1 to A4) is repeated. In one embodiment, as indicated by a solid line in FIG. 13, the segment coil A1 is held in a first position (an outermost position) of the deep slot S1 and a second position (an outermost position) of the shallow slot S43. It is noted that concerning the shallow second slots, such as the slots S43 and S44, the outermost positions in the radial direction are illustrated as second positions in FIGS. 13 and 14. The segment coil A2 is held in a second position of the slot S1 and a fourth position of the slot S43. The segment coil A3 is held in a fourth position of the slot S1 and a fifth position of the slot S43. The segment coil A4 is held in third positions of the slots S43 and S37.

Between the slots S1 and S43 on the power-line side, the segment coil A1 that protrudes from the slot S43 and the segment coil A2 that protrudes from the slot S1 are welded to each other. The segment coil A2 that protrudes from the slot S43 and the segment coil A3 that protrudes from the slot S1 are welded to each other. Between the slots S43 and S37 on the power-line side, the segment coil A3 that protrudes from the slot S43 and the segment coil A4 that protrudes from the slot S37 are welded to each other. The segment coil A4 that protrudes from the slot S43 and the next segment coil A5 that protrudes from the slot S37 are welded to each other. Such a connection pattern is repeated to constitute the first coil group A100 including the segment coils A1 to A16.

As illustrated in FIG. 9, the second coil group A200 that constitutes the series coil group U1 has a coil configuration where a connection pattern of four segment coils (e.g., A17 to A20) is repeated. In one embodiment, as indicated by a solid line in FIG. 14, the segment coil A17 is held in a fifth position of the slot S2 and a sixth position of the slot S44. The segment coil A18 is held in a sixth position of the slot S2 and an eighth position of the slot S44. The segment coil A19 is held in an eighth position of the slot S2 and a ninth position of the slot S44. The segment coil A20 is held in seventh positions of the slots S44 and S38.

Between the slots S2 and S44 on the power-line side, the segment coil A17 that protrudes from the slot S44 and the segment coil A18 that protrudes from the slot S2 are welded to each other. The segment coil A18 that protrudes from the slot S44 and the segment coil A19 that protrudes from the slot S2 are welded to each other. Between the slots S44 and S38 on the power-line side, the segment coil A19 that protrudes from the slot S44 and the segment coil A20 that protrudes from the slot S38 are welded to each other. The segment coil A20 that protrudes from the slot S44 and the next segment coil A21 that protrudes from the slot S38 are welded to each other. Such a connection pattern is repeated to constitute the second coil group A200 including the segment coils A17 to A32.

Series Coil Group U2

The series coil group U2 that constitutes the rest of the U-phase coil Cu will be described. As illustrated in FIG. 8, the first coil group B100 that constitutes the series coil group U2 has a coil configuration where a connection pattern of four segment coils (e.g., B1 to B4) is repeated. In one embodiment, as indicated by a dashed line in FIG. 13, the segment coil B1 is held in a sixth position of the slot S43 and a fifth position of the slot S37, and the segment coil B2 is held in seventh positions of the slots S43 and S37. The segment coil B3 is held in a ninth position of the slot S43 and an eighth position of the slot S37. The segment coil B4 is held in a sixth position of the slot S37 and an eighth position of the slot S31.

Between the slots S43 and S37 on the power-line side, the segment coil B1 that protrudes from the slot S37 and the segment coil B2 that protrudes from the slot S43 are welded to each other. The segment coil B2 that protrudes from the slot S37 and the segment coil B3 that protrudes from the slot S43 are welded to each other. Between the slots S37 and S31 on the power-line side, the segment coil B3 that protrudes from the slot S37 and the segment coil B4 that protrudes from the slot S31 are welded to each other. The segment coil B4 that protrudes from the slot S37 and the next segment coil B5 that protrudes from the slot S31 are welded to each other. Such a connection pattern is repeated to constitute the first coil group B100 including the segment coils B1 to B16.

As illustrated in FIG. 9, the second coil group B200 that constitutes the series coil group U2 has a coil configuration where a connection pattern of four segment coils (e.g., B17 to B20) is repeated. In one embodiment, as indicated by a dashed line in FIG. 14, the segment coil B17 is held in a second position of the slot S44 and a first position of the slot S38, and the segment coil B18 is held in third positions of the slots S44 and S38. The segment coil B19 is held in a fifth position of the slot S44 and a fourth position of the slot S38. The segment coil B20 is held in a second position of the slot S38 and a fourth position of the slot S32.

Between the slots S44 and S38 on the power-line side, the segment coil B17 that protrudes from the slot S38 and the segment coil B18 that protrudes from the slot S44 are welded to each other. The segment coil B18 that protrudes from the slot S38 and the segment coil B19 that protrudes from the slot S44 are welded to each other. Between the slots S38 and S32 on the power-line side, the segment coil B19 that protrudes from the slot S38 and the segment coil B20 that protrudes from the slot S32 are welded to each other. The segment coil B20 that protrudes from the slot S38 and the next segment coil B21 that protrudes from the slot S32 are welded to each other. Such a connection pattern is repeated to constitute the second coil group B200 including the segment coils B17 to B32.

Bent Shape of Segment Coil

Figure 16:
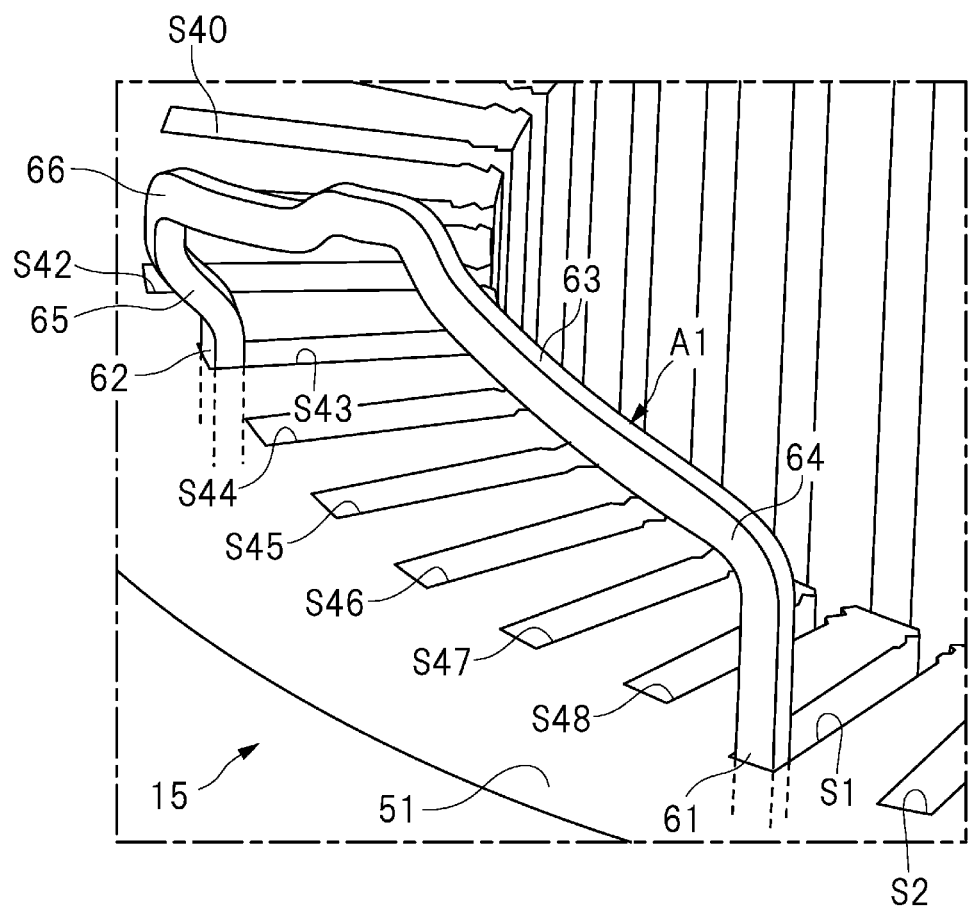
FIG. 16 is a perspective view of the stator core and the segment coil as viewed in a direction indicated by arrow α in FIG. 15B.

A bent shape of the segment coil A1 will now be described. FIG. 15A is a diagram illustrating a state of the stator core 15 and the segment coil A1 being separated from each other. FIG. 15B is a diagram illustrating a state of the stator core 15 and the segment coil A1 being assembled together. FIG. 16 is a perspective view of the stator core 15 and the segment coil A1 as viewed in a direction indicated by arrow α in FIG. 15B.

As illustrated in FIG. 13 above, the segment coil A1 is held at the outermost positions in the slots S1 and S43 in the radial direction. As illustrated in FIG. 15A, the depth of the slot S1 is "D1", and the depth of the slot S43 is "D2" less than "D1". That is, a holding position P1 of the segment coil A1 in the slot S1 and a holding position P2 of the segment coil A1 in the slot S43 are displaced from each other in the radial direction of the stator core 15. In this manner, the pair of slots S1 and S43 are displaced from each other in the radial direction so that the segment coil A1 can be held at predetermined positions in the slots S1 and S43 without excessively bending the segment coil A1. In other words, alignment with the holding positions is performed not in accordance with the bent shape of the segment coil A1 alone but by displacing the slots S1 and S43 as holding places from each other in the radial direction. This can reduce the number of bends of the segment coil A1.

As illustrated in FIGS. 15A, 15B, and 16, the segment coil A1 includes a coil side 61 held in the first slot S1, and a coil side 62 held in the second slot S43, and an end portion 63 that couples the pair of coil sides 61 and 62 to each other. In one embodiment, the coil side 61 may serve as a "first rectilinear portion", the coil side 62 may serve as a "second rectilinear portion", and the end portion 63 may serve as a "coupler". The coil side 61 that protrudes from the end surface 51 of the stator core 15 is coupled to the end portion 63 with a first curved portion 64 curved in the circumferential direction of the stator core 15. The coil side 62 that protrudes from the end surface 51 of the stator core 15 is coupled to the end portion 63 with a crank portion 65 bent in the radial direction of the stator core 15 and a second curved portion 66 curved in the circumferential direction of the stator core 15. That is, in the segment coil A1, it is possible to eliminate one of a pair of crank portions of a segment coil in related art.

Figure 17A:
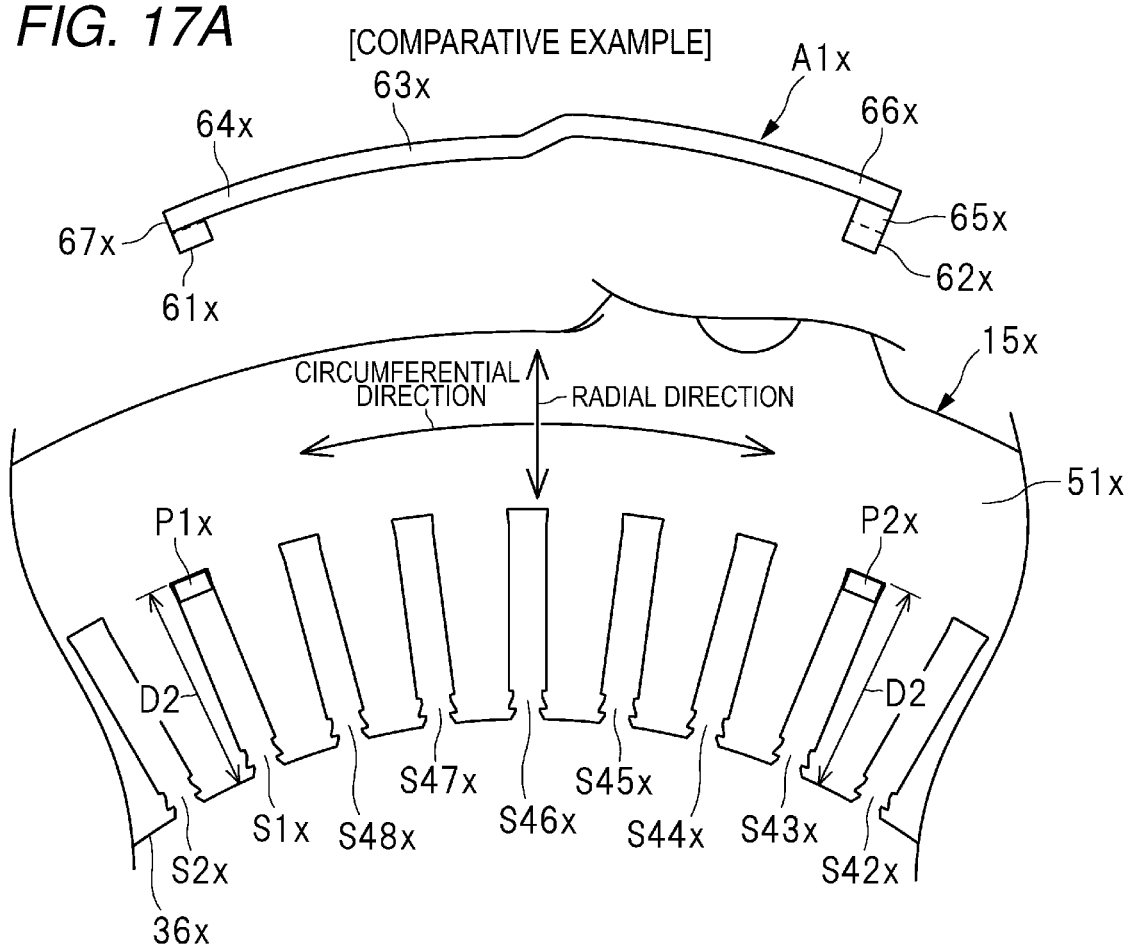
FIG. 17A is a diagram illustrating a state of a stator core and a segment coil as a comparative example being separated from each other.
Figure 17B:
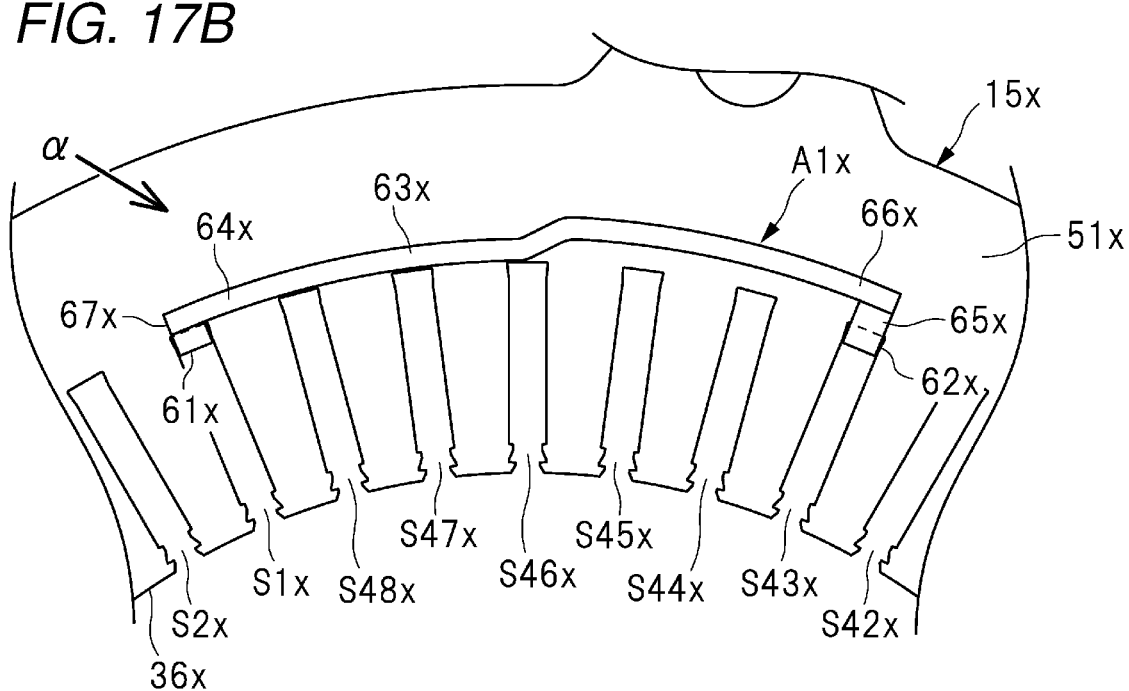
FIG. 17B is a diagram illustrating a state of the stator core and the segment coil being assembled together.
Figure 18:
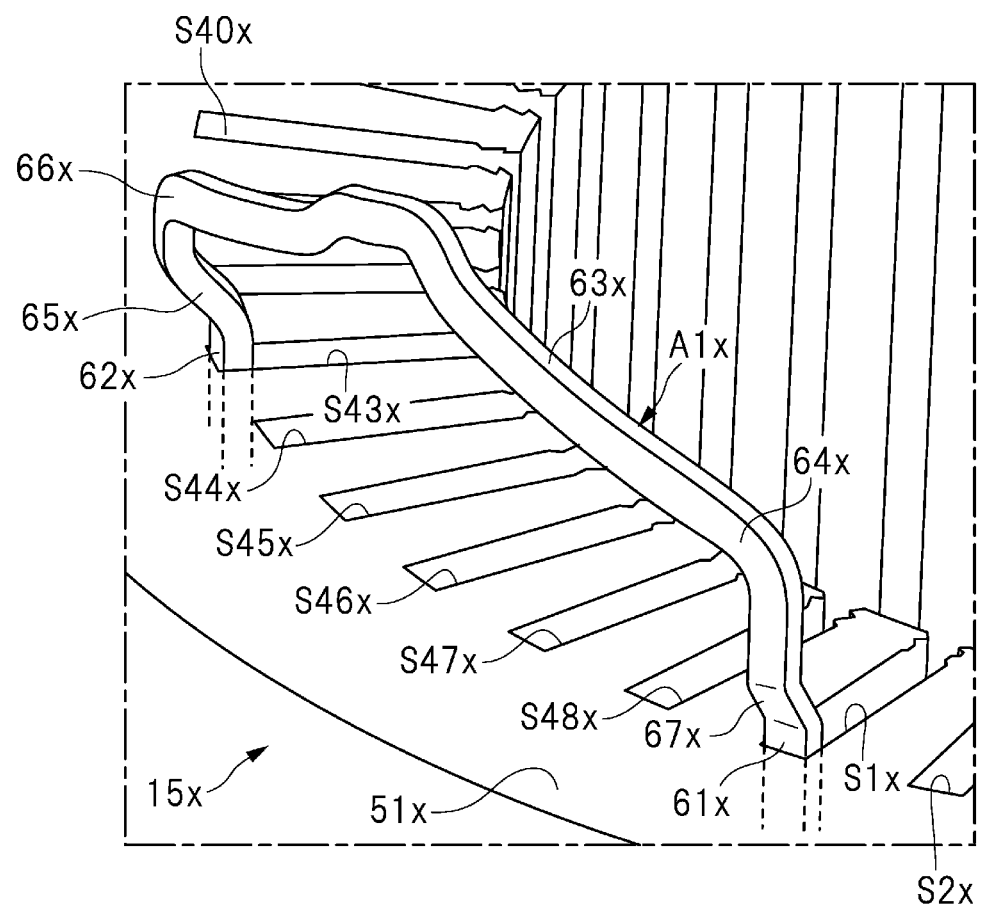
FIG. 18 is a perspective view of the stator core and the segment coil as viewed in a direction indicated by arrow α in FIG. 17B.

Hereinafter, a stator core 15x and a segment coil A1x as a comparative example will be described. FIG. 17A is a diagram illustrating a state of the stator core 15x and the segment coil A1x as the comparative example being separated from each other. FIG. 17B is a diagram illustrating a state of the stator core 15x and the segment coil A1x being assembled together. FIG. 18 is a perspective view of the stator core 15x and the segment coil A1x as viewed in a direction indicated by arrow α in FIG. 17B. It is noted that the segment coil A1 described as an example and the segment coil A1x described as the comparative example are held in substantially the same position.

As illustrated in FIG. 17A, in the stator core 15x of a hollow cylindrical shape, plural slots S1x to S48x are formed and extend outward in the radial direction from an inner peripheral surface 36x. These slots S1x to S48x have the depth "D2" in common. The segment coil A1x is held at outermost positions in the slots S1x and S43x in the radial direction. That is, a holding position P1x of the segment coil A1x in the slot S1x and a holding position P2x of the segment coil A1x in the slot S43x coincide with each other in the radial direction of the stator core 15x. When the slots S1x and S43x have such a common depth, the number of bends of the segment coil A1x is larger than the number of bends of the above-described segment coil A1.

As illustrated in FIGS. 17A, 17B, and 18, the segment coil A1x includes a coil side 61x held in the slot S1x, and a coil side 62x held in the slot S43x, and an end portion 63x that couples the pair of coil sides 61x and 62x to each other. The coil side 61x that protrudes from an end surface 51x of the stator core 15x is coupled to the end portion 63x with a crank portion 67x bent in the radial direction of the stator core 15x and a first curved portion 64x curved in the circumferential direction of the stator core 15x. The coil side 62x that protrudes from the end surface 51x of the stator core 15x is coupled to the end portion 63x with a crank portion 65x bent in the radial direction of the stator core 15x and a second curved portion 66x curved in the circumferential direction of the stator core 15x. That is, as compared with the above-described segment coil A1, the segment coil A1x additionally includes the crank portion 67x.

As described so far, a pair of slots that hold each segment coil have different depths from each other so that the segment coil can be held at predetermined positions in the slots without excessively bending the segment coil. In other words, alignment with the holding positions can be performed not in accordance with a bent shape of the segment coil alone but by displacing the slots as holding places from each other in the radial direction. This can reduce the number of bends of the segment coil. In this manner, the number of bends of the segment coils is reduced to decrease the number of processing steps of the segment coils, thus reducing the cost of the stator 10.

Temperature Sensor

Figure 19:
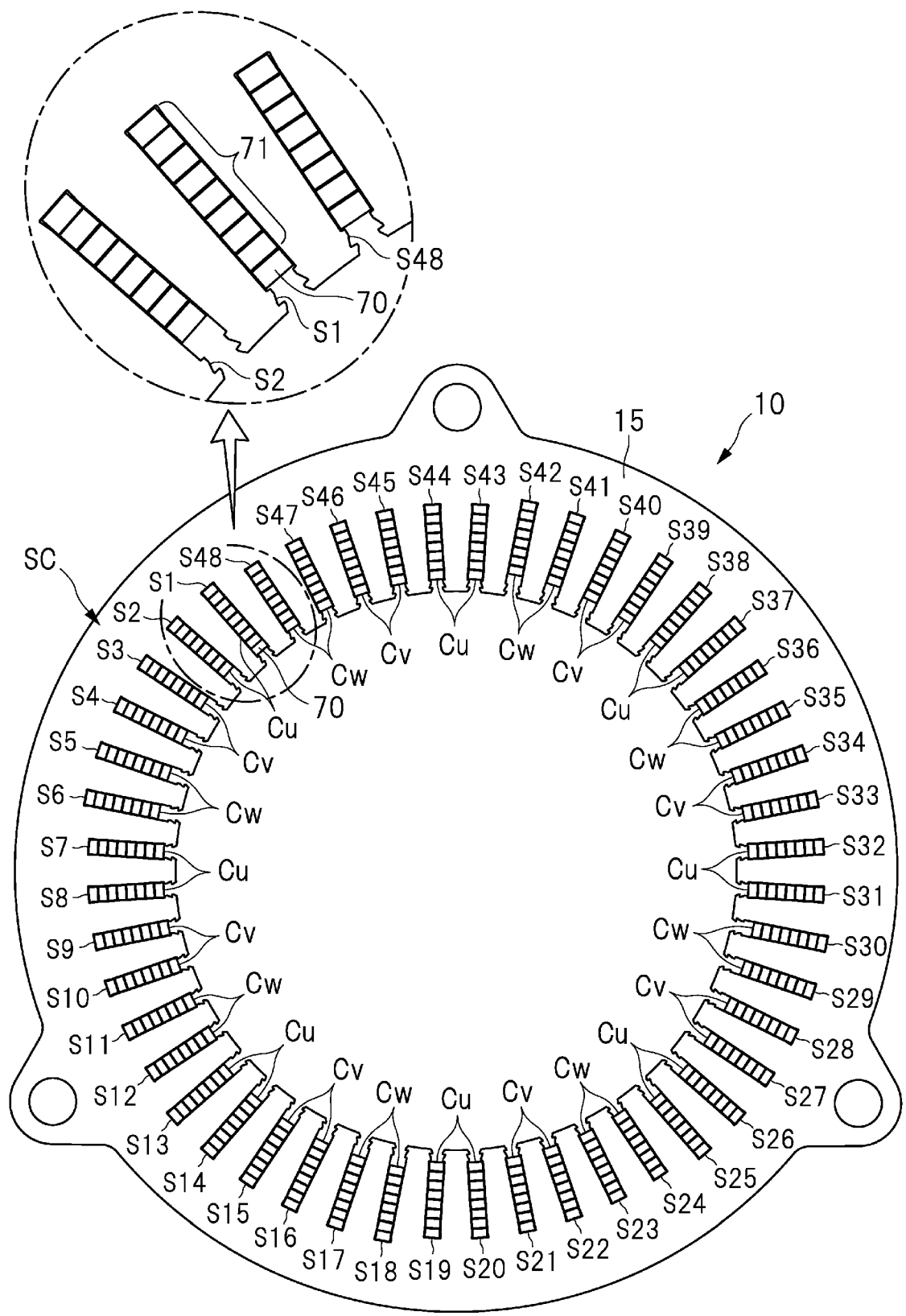
FIG. 19 is a cross-sectional view of the stator taken along line A-A in FIG. 1.

Next, a temperature sensor 70 to detect temperature of the stator coil SC will be described. FIG. 19 is a cross-sectional view of the stator 10 taken along line A-A in FIG. 1. As illustrated in an enlarged portion of FIG. 19, the slot S1 contains the temperature sensor 70 such as a thermistor to detect temperature of the stator coil SC. The temperature sensor 70 contained within the slot S1 is located on an inner side of plural coil sides 71 held in the slot S1 in the radial direction of the stator core 15. In one embodiment, the coil sides 71 may serve as "first rectilinear portions". In one example, because the deep slot S1 has the depth "D1", there is an open space on an inner side of the slot S1 in the radial direction even when eight coil sides 71 are held in the slot S1. Consequently, the temperature sensor 70 is contained within this open space. The temperature sensor 70 held in the slot S1 is secured within the slot S1 with a resin material such as varnish. It is noted that the coil sides 71 held in the slot S1 are coil sides of the segment coils A1 to A3, A16, and B13 to B16 as illustrated in FIG. 13.

In this manner, the temperature sensor 70 is contained within the slot S1 so that temperature of the stator coil SC can be appropriately detected to suitably control the rotary electric machine 11. In other words, as compared with the case of attaching the temperature sensor 70 to a coil end, for example, the temperature of the stator coil SC can be measured at a location where a higher degree of temperature can be obtained when the temperature sensor 70 is contained within the slot S1. Moreover, because the temperature sensor 70 is contained within the slot S1, the temperature sensor 70 can be in close contact with the coil sides 71 so as to measure the temperature of the stator coil SC at a location where a higher degree of temperature can be obtained. Furthermore, as illustrated in FIG. 1, with the temperature sensor 70 being attached substantially in a center of the stator core 15 in an axial direction, that is, in a longitudinal direction, the temperature of the stator coil SC can be measured at a location where a higher degree of temperature can be obtained.

It is noted that although the temperature sensor 70 is located on an inner side of the coil sides 71 in the radial direction in the illustrated example, this is not to be construed in a limiting sense. The temperature sensor 70 may be located on an outer side of the coil sides 71 in the radial direction or may be interposed between the coil sides 71. Although the temperature sensor 70 is attached to the slot S1 in the illustrated example, this is not to be construed in a limiting sense. The temperature sensor 70 may be contained within any one of other slots S2 to S6, S13 to S18, S25 to S30, and S37 to S42 insofar as the slot is one of the deep first slots. In the example illustrated in FIG. 1, the temperature sensor 70 is attached substantially in the center of the stator core 15 in the longitudinal direction. However, this is not to be construed in a limiting sense. The temperature sensor 70 may be attached to other portions.

Torque Ripple Decrease

Figure 20:
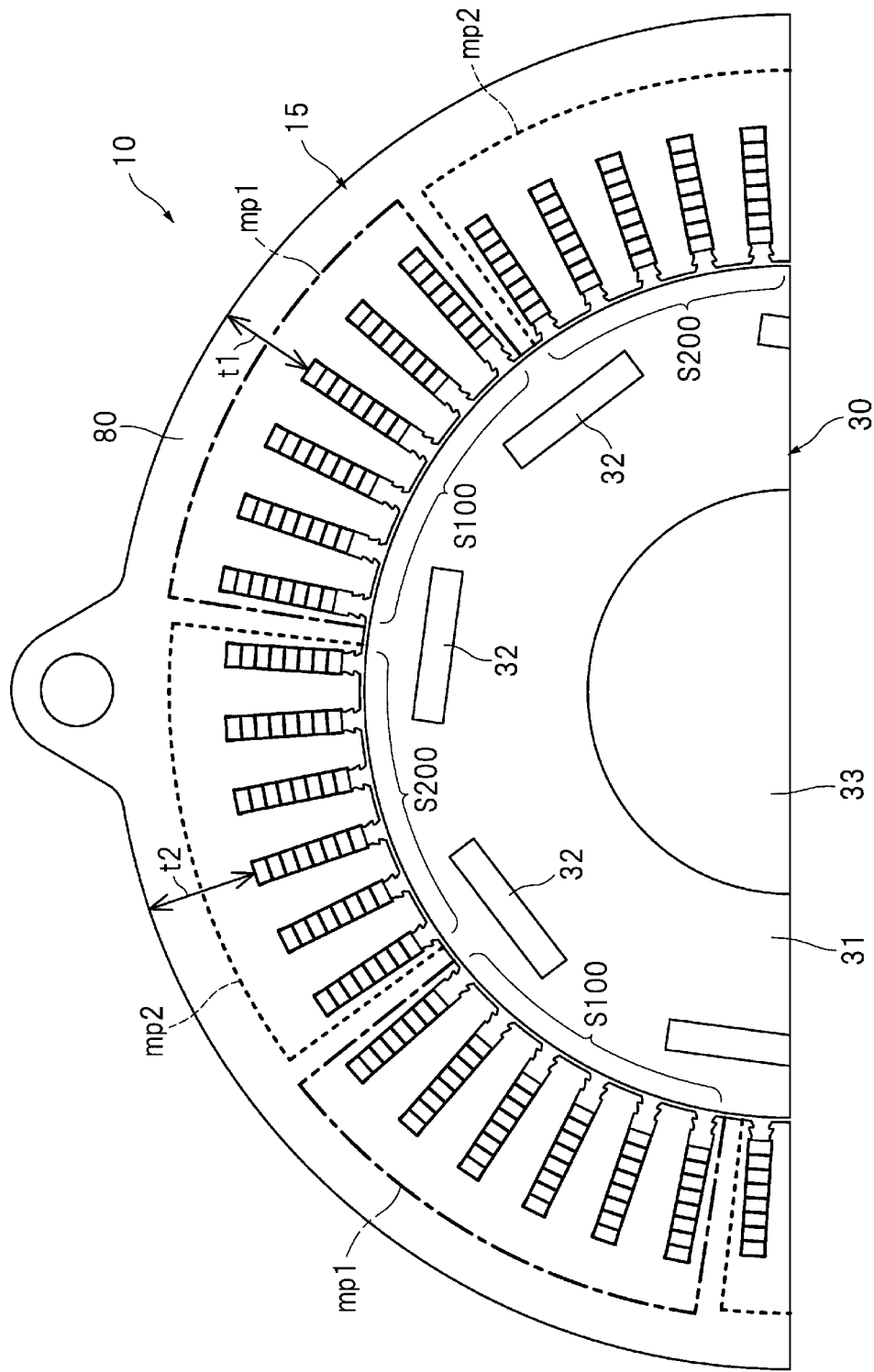
FIG. 20 is a diagram illustrating average magnetic path lengths of the stator core.
Figure 21:
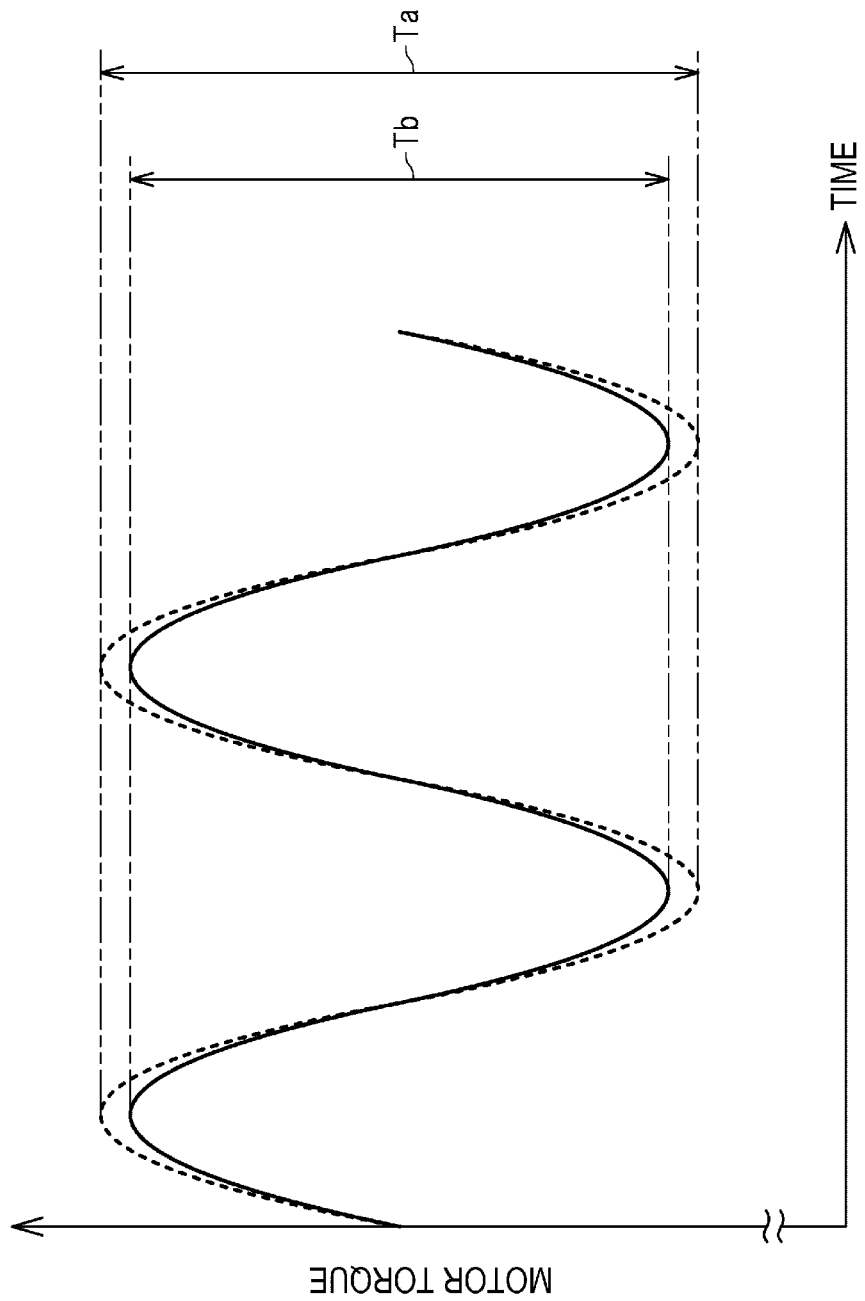
FIG. 21 is a graph illustrating a generation state of torque ripple.

Next, a torque ripple of the rotary electric machine 11 will be described. FIG. 20 is a diagram illustrating average magnetic path lengths of the stator core 15. FIG. 21 is a graph illustrating a generation state of the torque ripple. As illustrated in FIG. 20, the stator core 15 includes the first and second slot groups S100 and S200 alternately arranged in the circumferential direction. The first slot groups S100 include the deep first slots S1, S2 . . . having the depth D1. The second slot groups S200 include the shallow second slots S43, S44 . . . having the depth D2 less than the depth D1. Consequently, an outer-peripheral portion 80 of the stator core varies in thickness at different positions in the circumferential direction. In one example, the outer-peripheral portion 80 located on an outer side of each of the first slot groups S100 has a thickness "t1" whereas the outer-peripheral portion 80 located on an outer side of each of the second slot groups S200 has a thickness "t2" larger than "t1".

That is, on the outer side of the first slot group S100, the thickness t1 of the outer-peripheral portion 80 is smaller. Consequently, the outer-peripheral portion 80 has a less cross-sectional area, and an average magnetic path length mp1 surrounding the first slot group S100 is larger. In this manner, in a magnetic path surrounding the first slot group S100, the cross-sectional area of the outer-peripheral portion 80 is so small, and the average magnetic path length mp1 is so large that a magnetic resistance of the magnetic path increases. Meanwhile, on the outer side of the second slot group S200, the thickness t2 of the outer-peripheral portion 80 is larger. Consequently, the outer-peripheral portion 80 has a larger cross-sectional area, and an average magnetic path length mp2 surrounding the second slot group S200 is smaller. In this manner, in a magnetic path surrounding the second slot group S200, the cross-sectional area of the outer-peripheral portion 80 is so large, and the average magnetic path length mp2 is so small that a magnetic resistance of the magnetic path decreases.

Thus, the magnetic path surrounding the first slot group S100 can have a higher magnetic resistance than the magnetic path surrounding the second slot group S200 so as to decrease the torque ripple of the rotary electric machine 11. When only the second slot groups S200 are formed in the stator core 15, for example, the magnetic resistance is low all over the circumference of the stator core 15. Consequently, as indicated by a dashed line in FIG. 21, an amplitude of motor torque is "Ta" and notably changes. In contrast, as illustrated in FIG. 20, when not only the second slot groups S200 but also the first slot groups S100 are formed in the stator core 15, a magnetic resistance around the first slot group S100 is increased to raise the magnetic resistance of the whole stator core 15. Thus, as indicated by a solid line in FIG. 21, the amplitude of motor torque can be lessened to "Tb" less than "Ta" so as to decrease the torque ripple.

Needless to say, the disclosure is not limited to the foregoing embodiments, and various modifications can be made thereto within the scope that does not depart from the gist thereof. For example, the bent shape of the segment coils is not limited to the shape illustrated in FIG. 16 but other bent shapes may be employed. In the foregoing description, as illustrated in FIG. 16, one of the crank portions is eliminated from the segment coil. However, such segment coils with one of the crank portions being eliminated may be used for all of the segment coils that constitute the stator coil SC or some of the segment coils that constitute the stator coil SC.

In the foregoing description, the pair of series coil groups are connected in parallel to constitute each of the phase coils Cu, Cv, and Cw. However, this is not to be construed in a limiting sense. For example, three or more series coil groups may be connected in parallel to constitute each of the phase coils Cu, Cv, and Cw. Plural segment coils may be connected in series to constitute each of the phase coils Cu, Cv, and Cw. In the illustrated example, eight segment coils are inserted into each slot. However, this is not to be construed in a limiting sense. For example, more than eight segment coils may be inserted into each slot, and less than eight segment coils may be inserted into each slot. In the foregoing description, the stator core 15 where the number of the slots is 48 is used. However, this is not to be construed in a limiting sense. A stator core with another number of the slots may be used.

According to the embodiment of the disclosure, the slots extend outward in the radial direction from the inner peripheral surface of the stator core and include the first slots and the second slots shallower than the first slots, and each of the segment conductors includes a first rectilinear portion held in the first slot, and a second rectilinear portion held in the second slot. With this configuration, the number of bends of the segment conductors can be decreased to reduce the cost of the stator.

The invention claimed is:

1. A stator for a rotary electric machine, the stator comprising:
a stator core having a hollow cylindrical shape, the stator core including slots; and
a stator winding comprising segment conductors held in the slots, wherein
the slots extending outward in a radial direction from an inner peripheral surface of the stator core comprise
a first slot, and
a second slot shallower than the first slot, and
the segment conductors comprise a segment conductor including
a first rectilinear portion held in the first slot,
a second rectilinear portion held in the second slot, and
a coupler coupling the first rectilinear portion and the second rectilinear portion to each other, the first rectilinear portion and the second rectilinear portion protruding from an end surface of the stator core.

2. The stator according to claim 1, wherein
the slots include first slot groups each comprising first slots and second slot groups each comprising second slots,
the first slot groups and the second slot groups are alternately arranged in a circumferential direction of the stator core,
the first slots include the first slot, and the second slots include the second slot, and
the second slots are shallower than the first slots.

3. The stator according to claim 2, wherein
the first rectilinear portion that protrudes from the end surface of the stator core is coupled to the coupler with a first curved portion curved in a circumferential direction of the stator core, and
the second rectilinear portion that protrudes from the end surface of the stator core is coupled to the coupler with a crank portion bent in the radial direction of the stator core and a second curved portion curved in the circumferential direction of the stator core.

4. The stator according to claim 3, further comprising:
a temperature sensor held in the first slot.

5. The stator according to claim 4, wherein
the segment conductors comprise first rectilinear portions held in the first slot, and
the temperature sensor is located on an inner side of the first rectilinear portions in the radial direction of the stator core.

6. The stator according to claim 2, further comprising:
a temperature sensor held in the first slot.

7. The stator according to claim 6, wherein
the segment conductors comprise first rectilinear portions held in the first slot, and
the temperature sensor is located on an inner side of the first rectilinear portions in the radial direction of the stator core.

8. The stator according to claim 1, wherein
the first rectilinear portion that protrudes from the end surface of the stator core is coupled to the coupler with a first curved portion curved in a circumferential direction of the stator core, and
the second rectilinear portion that protrudes from the end surface of the stator core is coupled to the coupler with a crank portion bent in the radial direction of the stator core and a second curved portion curved in the circumferential direction of the stator core.

9. The stator according to claim 8, further comprising:
a temperature sensor held in the first slot.

10. The stator according to claim 9, wherein
the segment conductors comprise first rectilinear portions held in the first slot, and
the temperature sensor is located on an inner side of the first rectilinear portions in the radial direction of the stator core.

11. The stator according to claim 1, further comprising:
a temperature sensor held in the first slot.

12. The stator according to claim 11, wherein
the segment conductors comprise first rectilinear portions held in the first slot, and
the temperature sensor is located on an inner side of the first rectilinear portions in the radial direction of the stator core.

* * * * *